United States Patent
Zhang et al.

(10) Patent No.: US 12,413,745 B2
(45) Date of Patent: Sep. 9, 2025

(54) BI-DIRECTIONAL PREDICTION BOUNDARY PIXEL PADDING WITH OUT-OF-PICTURE-BOUNDARY MOTION VECTORS

(71) Applicant: QUALCOMM Incorporated, San Diego, CA (US)

(72) Inventors: Zhi Zhang, Munich (DE); Han Huang, San Diego, CA (US); Yao-Jen Chang, San Diego, CA (US); Chun-Chi Chen, San Diego, CA (US); Yan Zhang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 18/194,013

(22) Filed: Mar. 31, 2023

(65) Prior Publication Data

US 2023/0328257 A1   Oct. 12, 2023

Related U.S. Application Data

(60) Provisional application No. 63/362,861, filed on Apr. 12, 2022.

(51) Int. Cl.
*H04N 19/14*    (2014.01)
*H04N 19/159*   (2014.01)
(Continued)

(52) U.S. Cl.
CPC .......... *H04N 19/159* (2014.11); *H04N 19/14* (2014.11); *H04N 19/176* (2014.11); *H04N 19/52* (2014.11); *H04N 19/563* (2014.11)

(58) Field of Classification Search
CPC .... H04N 19/159; H04N 19/14; H04N 19/176; H04N 19/52; H04N 19/563
(Continued)

(56) References Cited

U.S. PATENT DOCUMENTS

| 2006/0034529 A1* | 2/2006 | Park ................... H04N 19/563 375/E7.113 |
| 2019/0082193 A1* | 3/2019 | Sun ..................... H04N 19/82 |

(Continued)

OTHER PUBLICATIONS

Bossen F., et al., "JEM Software Manual", Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

(Continued)

*Primary Examiner* — Albert Kir
(74) *Attorney, Agent, or Firm* — Shumaker & Sieffert, P.A.

(57) ABSTRACT

A device for decoding video data includes a memory configured to store video data; and one or more processors implemented in circuitry and configured to: determine that a boundary block of a picture of the video data is bi-directional inter-predicted using a first motion vector and a second motion vector, the boundary block having an edge that touches an edge of the picture; decode the picture, including decoding the boundary block; form a first intermediate padding block using the first motion vector; form a second intermediate padding block using the second motion vector; form a padding block using the first intermediate padding block and the second intermediate padding block; and assign padding values of the padding block to a padding region of the picture neighboring the boundary block on an opposite side of the edge of the picture.

30 Claims, 25 Drawing Sheets

(51) Int. Cl.
  *H04N 19/176* (2014.01)
  *H04N 19/52* (2014.01)
  *H04N 19/563* (2014.01)
(58) Field of Classification Search
  USPC .................................................. 375/240.15
  See application file for complete search history.

(56) References Cited

U.S. PATENT DOCUMENTS

| | | | | |
|---|---|---|---|---|
| 2021/0329287 | A1* | 10/2021 | Chiang | H04N 19/573 |
| 2022/0103828 | A1* | 3/2022 | Zhang | H04N 19/52 |
| 2022/0224911 | A1* | 7/2022 | Park | H04N 19/176 |
| 2024/0022758 | A1* | 1/2024 | Chen | H04N 19/139 |
| 2024/0291963 | A1* | 8/2024 | Chen | H04N 19/176 |
| 2024/0314348 | A1* | 9/2024 | Zhao | H04N 19/517 |

OTHER PUBLICATIONS

Bross B., et al., "Versatile Video Coding Editorial Refinements on Draft 10", JVET-T2001-v2, 20. JVET Meeting, Oct. 7, 2020-Oct. 16, 2020, Teleconference, (The Joint Video Experts Team of ISO/IEC JTC1/SC29/WG11 and ITU-T SG 16), Nov. 24, 2020 (Nov. 24, 2020), pp. 1-515.
Chen J., et al., "Algorithm Description for Versatile Video Coding and Test Model 3 (VTM 3)," 12th JVET Meeting, Oct. 3, 2018-Oct. 12, 2018, MACAO, (The Joint Video Exploration Team of ITU-T SG 16 WP 3 and ISO/IEC JTC 1/SC 29/ WG 11), No. JVET-L1002-v1, Dec. 24, 2018, XP030251962, pp. 1-48.
Chen J., et al., "Algorithm Description of Joint Exploration Test Model 6 (JEM 6)", 6th JVET Meeting, Hobart, AU, (The Joint Video Exploration Team (JVET) of ITU-T SG 16 WP 3 and ISO/IEC JTC 1/SC 29/WG 11), JVET-F1001-v2, Mar. 31-Apr. 7, 2017, May 31, 2017, 48 Pages, XP030150793.
Chen Y-W., et al., "AHG12: Enhanced Bi-Directional Motion Compensation", 25th JVET Meeting, Jan. 12, 2022-Jan. 21, 2022, Teleconference, (The Joint Video Exploration Team of ITU-T SG 16 WP3 and ISO/IEC JTC1/SC29), No. JVET-Y0125, Jan. 5, 2022, pp. 1-4.
Chen Y-W., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-44.
Coban M., et al., "Algorithm Description of Enhanced Compression Model 3 (ECM 3)", JVET-X2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-28.
Han Y., et al., "CE4.4.6: Improvement on Merge/Skip Mode," JVET-L0399_r2, Joint Video Exploration Team (JVET) of ITU-T SG 16 WP 3 and ISO/IEC JTC 1/SC 29/WG 11, JVET-L0399, 12th Meeting: Macao, CN, Oct. 3-12, 2018, pp. 1-6.
Henry F., et al., "Residual Coefficient Sign Prediction", 4th JVET Meeting, Oct. 15, 2016-Oct. 21, 2016, Chengdu, (The Joint Video Exploration Team of ITU-T SG 16 WP 3 and ISO/IEC JTC 1/SC 29/WG 11), No. JVET-D0031, Oct. 20, 2016, JVET-D0031-v2, JVET-D0031-v4, XP030150258, pp. 1-6.
International Search Report and Written Opinion—PCT/US2023/017419—ISAEPO—Jun. 26, 2023.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
Itu-T H.266: "Series H: Audiovisual and Multimedia Systems Infrastructure of Audiovisual Services—Coding of Moving Video", Versatile Video Coding, The International Telecommunication Union, Aug. 2020, 516 pages.
Lin J-L., et al., "Motion Vector Coding in the HEVC Standard", IEEE Journal of Selected Topics in Signal Processing, vol. 7, No. 6, Dec. 2013, pp. 957-968.
Lin Z-Y., et al., "CE10.2.1: OBMC", JVET-L0101-v1, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-7, No. m44107, Oct. 1, 2018, XP030191474.
Seregin V., et al., "CE4-3.1a and CE4-3.1b: Unidirectional Local Illumination Compensation with Affine Prediction", JVET-O0066-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.
Su Y-C., et al., "CE4-related: Generalized Bi-prediction Improvements Combined from JVET-L0197 and JVET-L0296", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0646-v5, pp. 1-6.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668.
Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, No. JCTVC-N1003_v1, 14th Meeting, Vienna, AT, Jul. 25-Aug. 2, 2013, 311 Pages.
Wikipedia: "Euclidean distance", Contributors to Wikimedia projects on May 28, 2002, pp. 1-11.
Wikipedia: "ISO/IEC 8859-1", Contributors to Wikimedia projects on Sep. 19, 2001, pp. 1-15.
Winken M., et al., "CE10: Multi-Hypothesis Inter Prediction (Test 10.1.2)", JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, XP030200865, pp. 1-14.
Zhang Y., et al., "CE4.5.2: Motion Compensated Boundary Pixel Padding", Joint Video Exploration Team (JVET) of ITU-T SG 16 WP 3 and ISO/IEC JTC 1/SC 29/WG 11, 11th Meeting: Ljubljana, SI, JVET-K0363, JVET-K0363_v2, Jul. 10-18, 2018, pp. 1-3.
Zhang Z., et al., "EE2-Related: Motion Compensation Boundary Padding", Joint Video Experts Team (JVET) of ITU-T SG 16 WP 3 and ISO/IEC JTC 1/SC 29, 26th Meeting, by teleconference, Apr. 20-29, 2022, JVET-Z0130-v5, Apr. 26, 2022, 5 Pages.

* cited by examiner

BI-DIRECTIONAL PREDICTION BOUNDARY PIXEL PADDING WITH OUT-OF-PICTURE-BOUNDARY MOTION VECTORS

This application claims the benefit of U.S. Provisional Application No. 63/362,861, filed Apr. 12, 2022, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for bi-directional prediction of padding pixels for a picture using motion information of a bi-directional inter-predicted boundary block of the picture. In particular, the boundary block is a block that is adjacent to (e.g., touches) a picture boundary (edge). Motion information for the boundary block may include two motion vectors that refer to two distinct reference blocks. Blocks adjacent to the reference blocks in a direction opposite of the edge touching the boundary block may be used to calculate the padding pixels. The padding pixels may subsequently be used as reference pixels of a reference block to which a motion vector of an inter-predicted block refers. In this manner, the padding pixels may be more accurate, such that residual data representing differences between a prediction block formed from the padding pixels and actual values for a block predicted using the prediction block can be reduced. Reduction of such residual data may reduce a bitrate for an overall bitstream including the video data.

In one example, a method of decoding video data includes determining that a boundary block of a picture of video data is bi-directional inter-predicted using a first motion vector and a second motion vector, the boundary block having an edge that touches an edge of the picture; decoding the picture, including decoding the boundary block; forming a first intermediate padding block using the first motion vector; forming a second intermediate padding block using the second motion vector; forming a padding block using the first intermediate padding block and the second intermediate padding block; and assigning padding values of the padding block to a padding region of the picture neighboring the boundary block on an opposite side of the edge of the picture.

In another example, a device for decoding video data includes a memory configured to store video data; and one or more processors implemented in circuitry and configured to: determine that a boundary block of a picture of the video data is bi-directional inter-predicted using a first motion vector and a second motion vector, the boundary block having an edge that touches an edge of the picture; decode the picture, including decoding the boundary block; form a first intermediate padding block using the first motion vector; form a second intermediate padding block using the second motion vector; form a padding block using the first intermediate padding block and the second intermediate padding block; and assign padding values of the padding block to a padding region of the picture neighboring the boundary block on an opposite side of the edge of the picture.

In another example, a computer-readable storage medium has stored thereon instructions that, when executed, cause a processor to: determine that a boundary block of a picture of video data is bi-directional inter-predicted using a first motion vector and a second motion vector, the boundary block having an edge that touches an edge of the picture; decode the picture, including decoding the boundary block; form a first intermediate padding block using the first motion vector; form a second intermediate padding block using the second motion vector; form a padding block using the first intermediate padding block and the second intermediate padding block; and assign padding values of the padding block to a padding region of the picture neighboring the boundary block on an opposite side of the edge of the picture.

In another example, a device for decoding video data includes means for determining that a boundary block of a picture of video data is bi-directional inter-predicted using a first motion vector and a second motion vector, the boundary block having an edge that touches an edge of the picture; means for decoding the picture, including decoding the boundary block; means for forming a first intermediate padding block using the first motion vector; means for forming a second intermediate padding block using the second motion vector; means for forming a padding block using the first intermediate padding block and the second intermediate padding block; and means for assigning padding values of the padding block to a padding region of the picture neighboring the boundary block on an opposite side of the edge of the picture.

The details of one or more examples are set forth in the accompanying drawings and the description below. Other features, objects, and advantages will be apparent from the description, drawings, and claims.

DETAILED DESCRIPTION

Video coding generally includes partitioning pictures into blocks (e.g., coding units (CUs)) and then coding (encoding or decoding) each of the blocks. Coding a current block generally includes forming a prediction block for the current block and coding a residual block representing differences between the original block and the prediction block. Forming the prediction block may include using samples within the current picture (intra-prediction) or samples in one or more previously coded, reference pictures (inter-prediction). Inter-prediction includes using a motion vector to identify a reference block in a reference picture to be used to form the prediction block. In some examples (for a bi-predicted block), two motion vectors may be used to identify two reference blocks, which may be combined to form the prediction block (e.g., averaged or using a weighted combination).

A picture may have a defined size of M×N samples (pixels). These samples may be the encoded and decoded samples. In some cases, a motion vector may refer to a reference block that extends beyond the boundaries of the picture. Some solutions to address this occurrence are to clip the motion vector such that the reference picture lies fully within the boundaries of the picture. Other solutions involve calculating padding values for samples beyond the boundaries of the picture, then using the padding values as reference values of the reference block. This disclosure describes techniques for calculating padding values using motion information of a bi-directionally predicted block. In particular, if a block is a boundary block (that touches an edge of the picture) and is bi-directionally predicted, blocks adjacent to the reference blocks identified by the motion vectors and in the direction as the edge shared by the boundary block and the boundary block may be used to form the padding values.

These techniques may yield more accurate padding values, such that subsequent prediction of blocks using the padding values may reduce bitrate of a bitstream. That is, residual values for the subsequently predicted blocks may be lower, thereby decreasing the amount of data coded in the bitstream.

Figure 1:
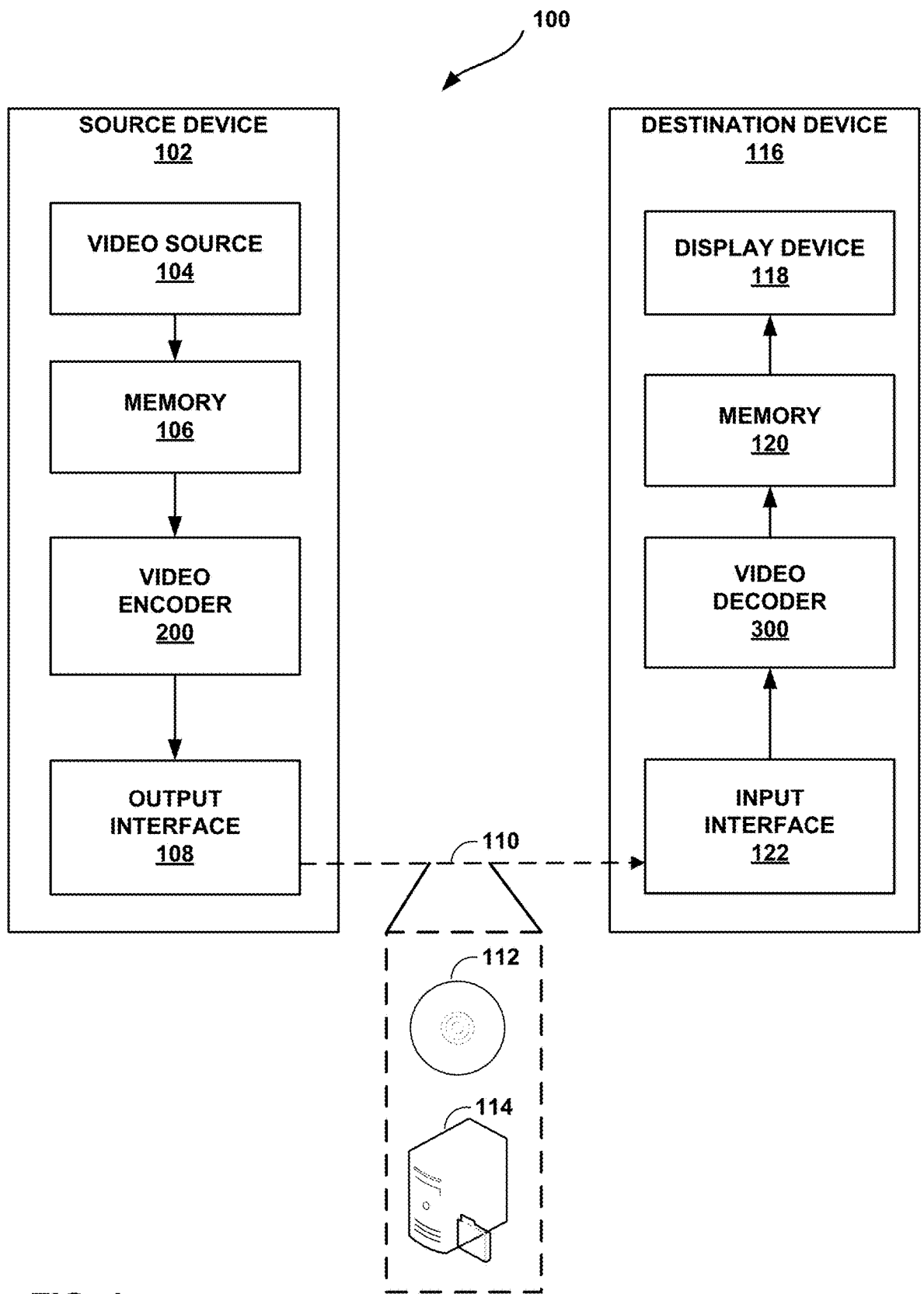
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smart-phones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for calculating padding values using bi-directional motion information. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for calculating padding values using bi-directional motion information. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs).

According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y 32 16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sampleby-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

ITU-T H.266/Versatile Video Coding (VVC) is one video coding standard into which the techniques of this disclosure may be incorporated. In VVC, coded blocks are generally referred to as coding units (CUs). In VVC, motion parameters including motion vectors, reference picture indices, and reference picture list usage index, and additional information needed for the new coding feature of VVC may be coded for an inter-predicted CU and used for inter-predicted sample generation. Motion parameters can be signalled in an explicit or implicit manner. When a CU is coded with skip mode, the CU is associated with one prediction unit (PU) and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of refined inter prediction coding tools, including extended merge prediction, merge mode with MVD (MMVD), symmetric MVD (SMVD) signalling, affine motion compensated prediction, subblock-based temporal motion vector prediction (SbTMVP), adaptive motion vector resolution (AMVR), motion field storage: 1/16th luma sample MV storage and 8×8 motion field compression, bi-prediction with CU-level weight (BCW), bi-directional optical flow (BDOF), decoder side motion vector refinement (DMVR), geometric partitioning mode (GPM), and combined inter and intra prediction (CIIP).

In VVC regular merge mode, the merge candidate list is constructed by including the following five types of candidates in order: 1) Spatial MVP from spatial neighbour CUs, 2) Temporal MVP from collocated CUs, 3) History-based MVP from an FIFO table, 4) Pairwise average MVP, and 5) Zero MVs. The size of merge list is signalled in sequence parameter set header and the maximum allowed size of merge list is 6. For each CU code in merge mode, an index of best merge candidate is encoded using truncated unary binarization (TU). The derivation process of each category of merge candidates is provided in this session. As done in HEVC, VVC also supports parallel derivation of the merging candidate lists for all CUs within a certain size of area.

Figure 2:
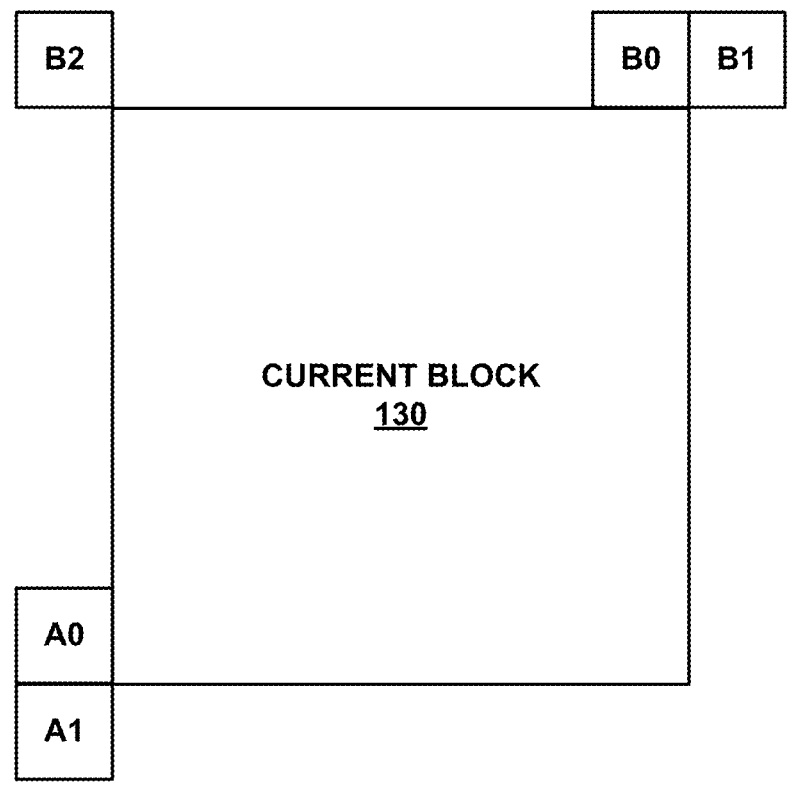
FIG. 2 is a conceptual diagram illustrating positions of spatial merge candidates for a current block.

FIG. 2 is a conceptual diagram illustrating positions of spatial merge candidates for current block 130. The derivation of spatial merge candidates in VVC is same to that in HEVC except the positions of the first two merge candidates are swapped. A maximum of four merge candidates are selected among candidates located in the positions depicted in FIG. 2. In VVC, the order of derivation is B0, A0, B1, A1 and B2. Position B2 is considered, per VVC, only when one or more than one CUs of position B0, A0, B1, A1 are not available (e.g., because it belongs to another slice or tile) or is intra coded. After candidate at position A1 is added, the addition of the remaining candidates is subject to a redundancy check which ensures that candidates with same motion information are excluded from the list so that coding efficiency is improved.

Figure 3:
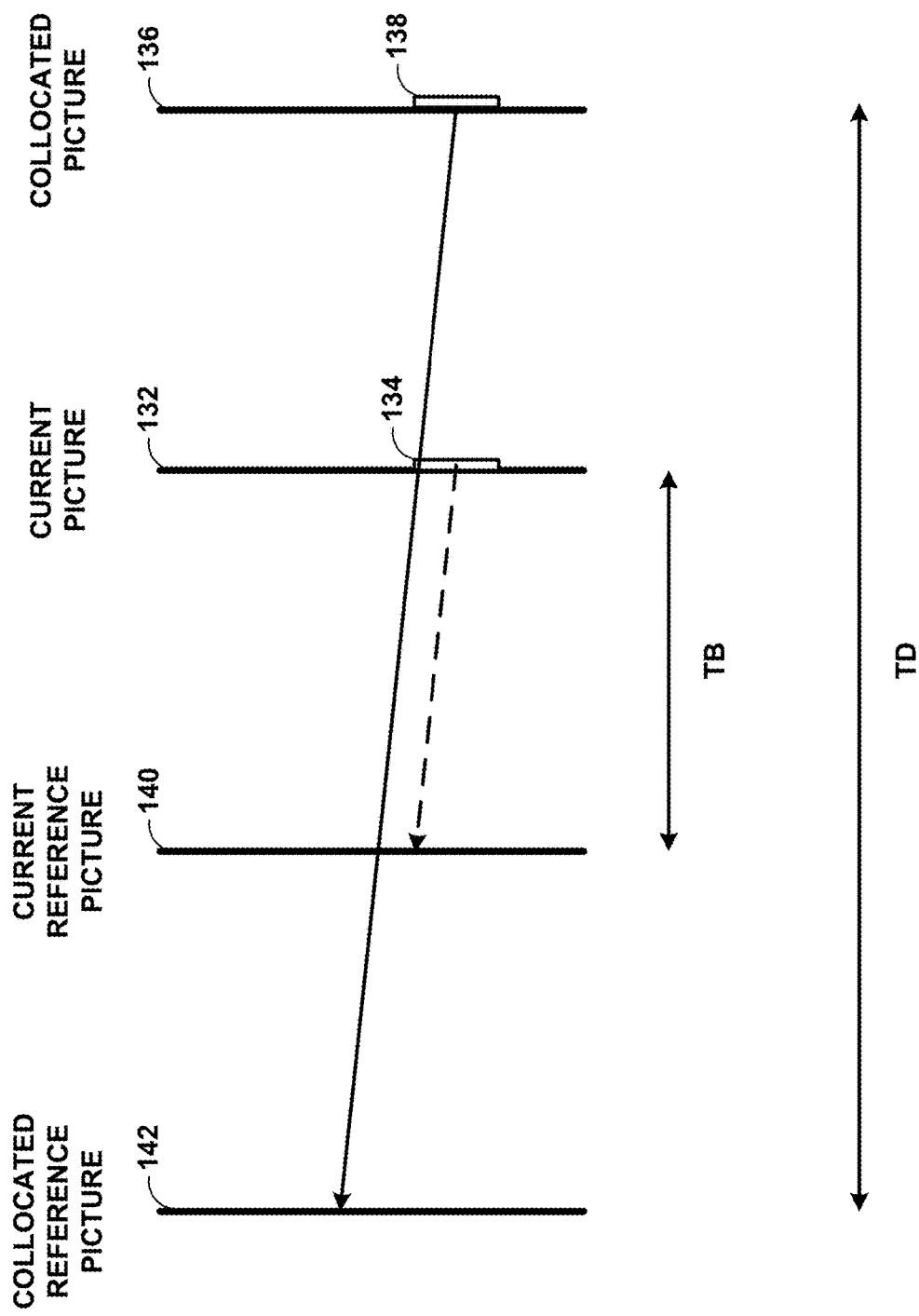
FIG. 3 is a conceptual diagram illustrating motion vector scaling for a temporal merge candidate.

FIG. 3 is a conceptual diagram illustrating motion vector scaling for a temporal merge candidate. In particular, FIG. 3 depicts current picture 132 including current block 134, for which motion information is to be formed using a temporal merge candidate.

In temporal merge candidate derivation, per VVC, one candidate may be added to the merge candidate list (also referred to as the "merge list"). In particular, in the derivation of the temporal merge candidate, a scaled motion vector is derived based on a co-located CU belonging to the collocated reference picture. The reference picture list to be used for derivation of the co-located CU is explicitly signaled in the slice header. The scaled motion vector for temporal merge candidate is obtained as illustrated by the dashed line in FIG. 3, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of the temporal merge candidate is set equal to zero.

Thus, a video coder (e.g., video encoder 200 or video decoder 300) may determine collocated block 138 of collocated picture 136. Collocated block 138 has a motion vector referring to a reference block of collocated reference picture 142. TD represents a picture order count (POC) difference between collocated picture 136 and collocated reference picture 142, while TB represents a POC difference between current picture 132 and current reference picture 140. As such, the motion vector of collocated block 138 may be scaled according to the difference between TD and TB to form the motion vector of current block 134 to refer to a reference block of current reference picture 140.

Figure 4:
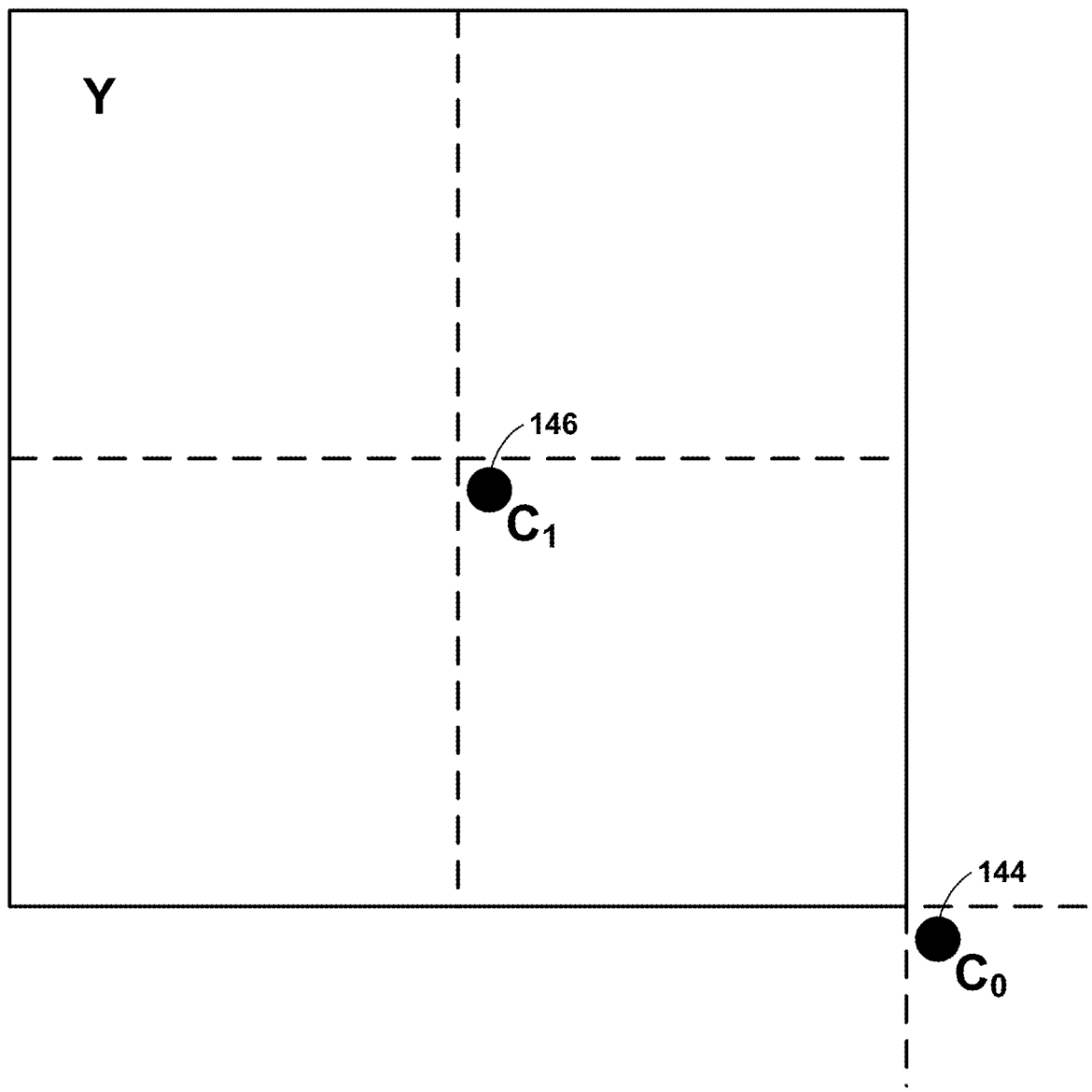
FIG. 4 is a conceptual diagram illustrating candidate positions for a temporal merge candidate.

FIG. 4 is a conceptual diagram illustrating candidate positions for a temporal merge candidate. The position for the temporal candidate is selected between candidates C0 144 and C1 146, as depicted in FIG. 4. If a CU at position C0 144 is not available, is intra coded, or is outside of the current row of CTUs, position C1 146 is used. Otherwise, position C0 144 is used in the derivation of the temporal merge candidate. That is, when position C0 144 is used, the temporal merge candidate motion vector is the motion vector of the block neighboring a collocated block and including position C0 144. Otherwise, the temporal merge candidate motion vector is the motion vector of a sub-block of the collocated block at position C1 146.

In VVC, the history-based MVP (HMVP) merge candidates are added to the merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is used where redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced: 1) The number of HMPV candidates is used for merge list generation is set as (N<=4)? M: (8−N), where N indicates number of existing candidates in the merge list and M indicates number of available HMVP candidates in the table. 2) Once the total number of available merge candidates reaches the maximally allowed merge candidates minus 1, the merge candidate list construction process from HMVP is terminated.

Figure 5:
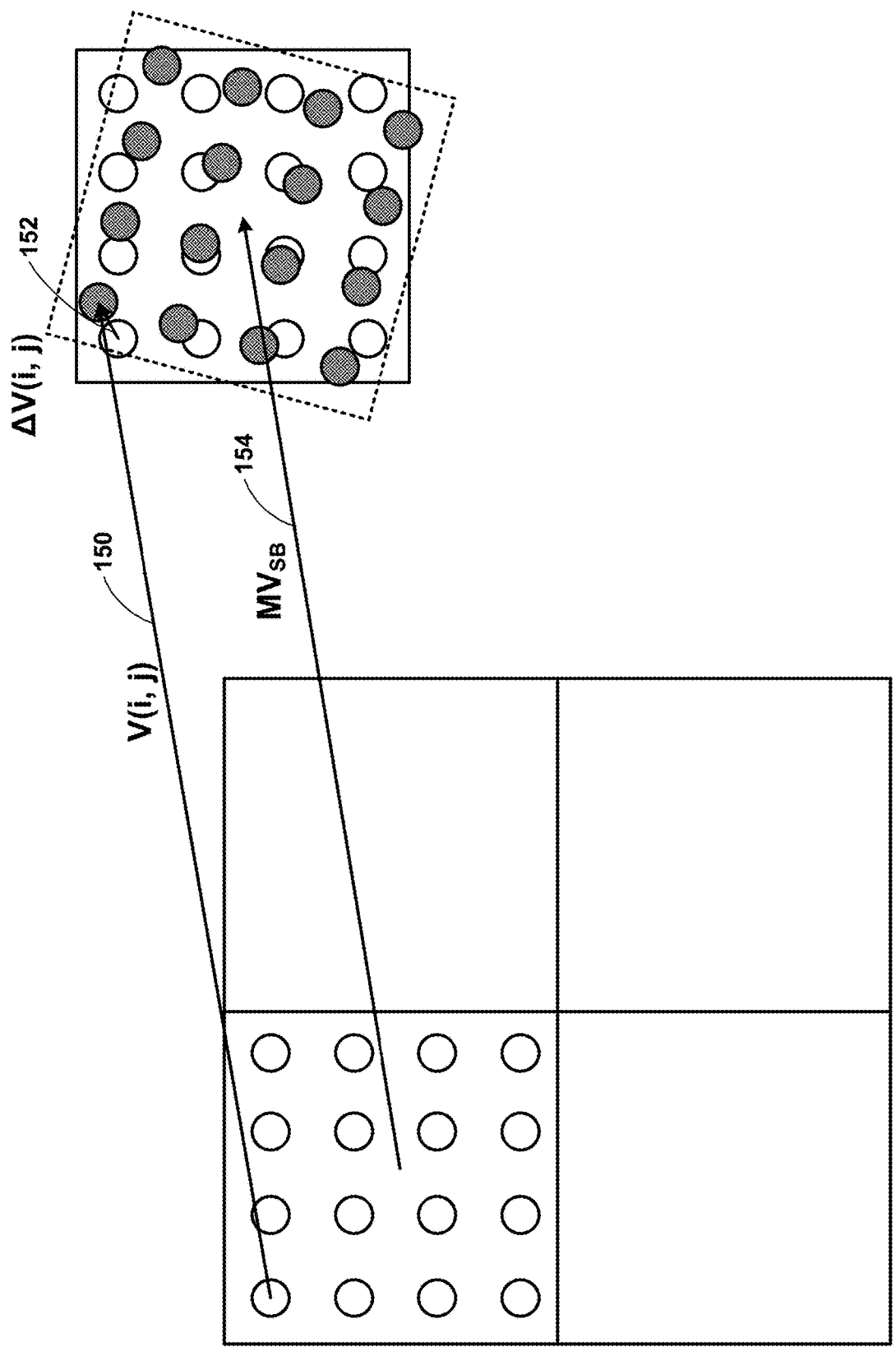
FIG. 5 is a conceptual diagram illustrating a prediction refinement with optical flow for affine mode technique.

FIG. 5 is a conceptual diagram illustrating a prediction refinement with optical flow for affine mode technique. Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. When the merge list is not full after pair-wise average merge candidates are added, the zero MVPs are inserted in the end until the maximum merge candidate number is encountered.

Subblock based affine motion compensation can save memory access bandwidth and reduce computation complexity compared to pixel based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four steps:

Step 1) The subblock-based affine motion compensation is performed to generate subblock prediction I(i,j).

Step 2) The spatial gradients g_x (i,j) and g_y (i,j) of the subblock prediction are calculated at each sample location using a 3-tap filter [−1, 0, 1]. The gradient calculation is the same as gradient calculation in BDOF:

$$g_x(i, j)=(I(i+1, j)>>\text{shigt1})=(I(i-1, j)>>\text{shift1})$$

$$g_y(i, j)=(I(i,j+1)>>\text{shigt1})=(I(i,j-1)>>\text{shift1})$$

shif1 is used to control the gradient's precision. The subblock (i.e., 4×4) prediction is extended by one sample on each side for the gradient calculation. To avoid additional memory bandwidth and additional interpolation computation, those extended samples on the extended borders are copied from the nearest integer pixel position in the reference picture.

Step 3) The luma prediction refinement is calculated by the following optical flow equation:

$$\Delta I(i, j)=g_x(i, j)*\Delta v_x(i, j)*\Delta v_y(i, j)$$

where $\Delta v(i, j)$ 152 is the difference between the sample MV computed for sample location (i, j), denoted by v(i,j) 150, and the subblock MV ($MV_{SB}$) 154 of the subblock to which sample (i, j) belongs, as shown in FIG. 5. The $\Delta v(i, j)$ is quantized in the unit of 1/32 luma sample precision.

Since the affine model parameters and the sample location relative to the subblock center are not changed from subblock to subblock, $\Delta v(i, j)$ can be calculated for the first subblock, and reused for other subblocks in the same CU. Let dx(i, j) and dy(i, j) be the horizontal and vertical offset from the sample location (i, j) to the center of the subblock $(x_{SB}, y_{SB})$, $\Delta v(x, y)$ can be derived by the following equations:

$$\begin{cases} dx(i, j) = i - x_{SB} \\ dy(i, j) = j - y_{SB} \end{cases}$$

$$\begin{cases} \Delta v_x(i, j) = C*dx(i, j) + D*dy(i, j) \\ \Delta v_y(i, j) = E*dx(i, j) + F*dy(i, j) \end{cases}$$

In order to keep accuracy, the center of the subblock $(x_{SB}, y_{SB})$ may be calculated as $((W_{SB}-1)/2, (H_{SB}-1)/2)$, where $W_{SB}$ and $H_{SB}$ are the subblock width and height, respectively.

For 4-parameter affine model, $$\begin{cases} C = F = \dfrac{v_{1x} - v_{0x}}{w} \\ E = -D = \dfrac{v_{1y} - v_{0y}}{w} \end{cases}$$

For 6-parameter affine model, $$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement $\Delta I(i, j)$ is added to the subblock prediction I(i, j). The final prediction I' is generated as the following equation:

$$I'(i, j) = I(i, j) + \Delta I(i, j)$$

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals according to bi-direction with CU-level weight (BCW) mode:

$$P_{bi-pred} = ((8-w)*P_0 + w*P_1 + 4) >> 3$$

In BCW, five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

At the encoder, fast search algorithms are applied to find the weight index without significantly increasing the encoder complexity. These algorithms are summarized as follows. For further details readers are referred to the VTM software and document NET-L0646. When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e., equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g., equal weight.

Figure 6:
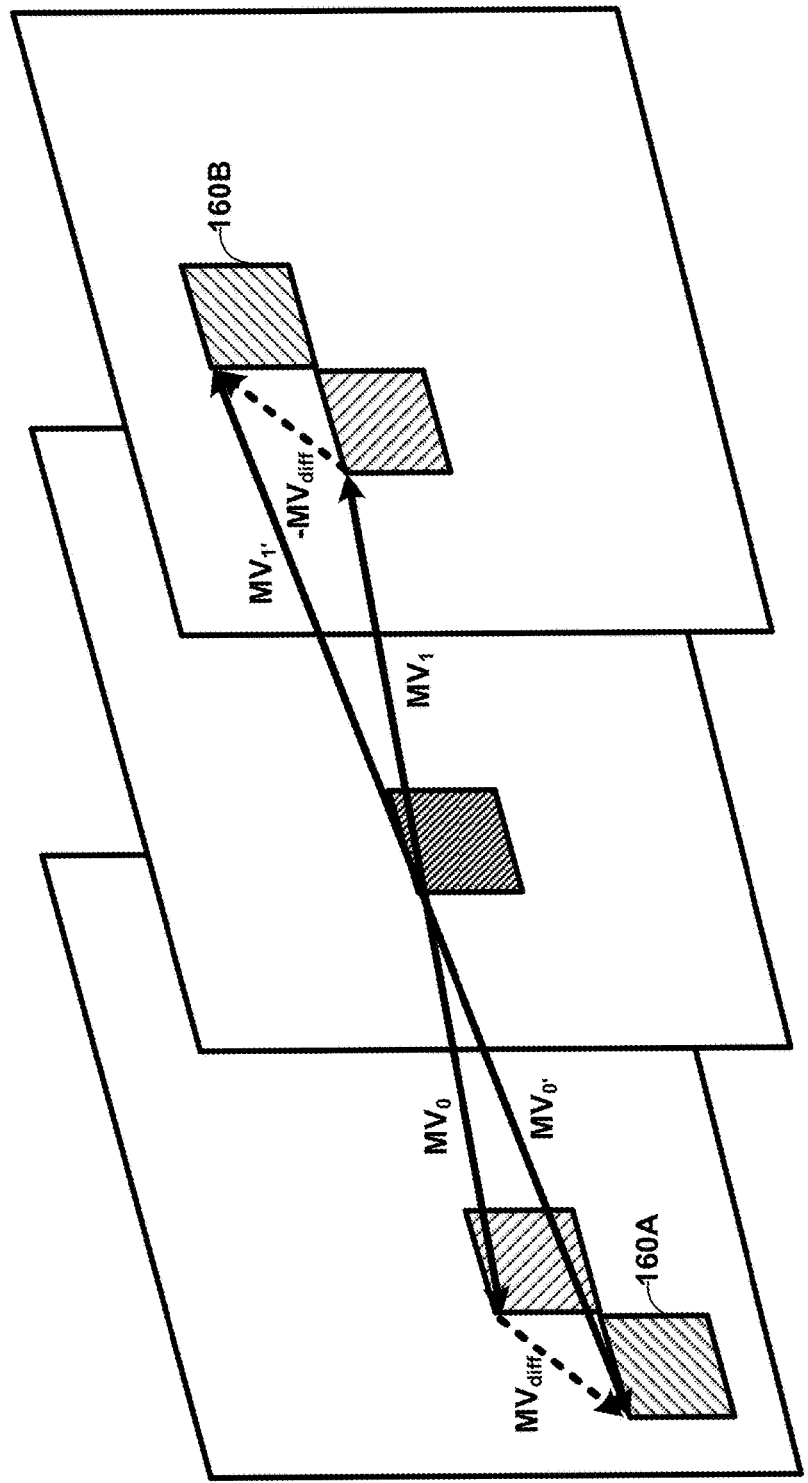
FIG. 6 is a conceptual diagram illustrating decoder side motion vector refinement (DMVR).

FIG. 6 is a conceptual diagram illustrating decoder side motion vector refinement (DMVR). In the Versatile Video Coding standard (VVC), the bilateral-matching based decoder side motion vector refinement (DMVR) is applied to increase the accuracy of the MVs of a bi-prediction merge candidate. To perform the sub-block based bilateral matching (BM) method, video encoder 200 and video decoder 300 may calculate the SAD between candidate blocks 160A, 160B in the reference picture list L0 and list L1. As illustrated in FIG. 6, candidate blocks 160A, 160B may generally represent any candidate blocks around the blocks identified by the initial MV. The pair of candidate blocks with the lowest SAD is associated with a motion vector that becomes the refined MV and is used to generate the bi-predicted signal. The SAD of the initial MVs is subtracted by ¼ of the SAD value to serve as regularization term. The temporal distances (i.e., Picture Order Count (POC) difference) from two reference pictures to the current picture shall be the same, therefore, the MVD0 is just the opposite sign of MVD1.

The refinement search range is two integer luma samples from the initial MV. The searching includes the integer sample offset search stage and fractional sample refinement stage. 25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x, y) = A(x - x_{min})^2 + B(y - y_{min})^2 + C$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1,0) - E(1,0))/(2(E(-1,0) + E(1,0) - 2E(0,0)))$$

$$y_{min} = (E(0,-1) - E(0,1))/(2((0,-1) + E(0,1) - 2E(0,0)))$$

The value of $x_{min}$ and $y_{min}$ are automatically constrained to be between $-8$ and $8$ since all cost values are positive and the smallest value is $E(0,0)$. This corresponds to half pixel (pel) offset with 1/16th-pel MV accuracy in VVC. The computed fractional $(x_{min}, y_{min})$ are added to the integer distance refinement MV to get the sub-pixel accurate refinement delta MV.

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

When the width and/or height of a CU are larger than 16 luma samples, it will be further split into subblocks with width and/or height equal to 16 luma samples for the DMVR process. In VVC, DMVR can be applied for the CUs that are coded with the following modes and features: CU level merge mode with bi-prediction MV, one reference picture is in the past and another reference picture is in the future with respect to the current picture, the distances (i.e., POC difference) from two reference pictures to the current picture are same, both reference pictures are short-term reference pictures, CU has more than 64 luma samples, both CU height and CU width are larger than or equal to 8 luma samples, BCW weight index indicates equal weight, WP is not enabled for the current block, and CIIP mode is not used for the current block.

Figure 7:
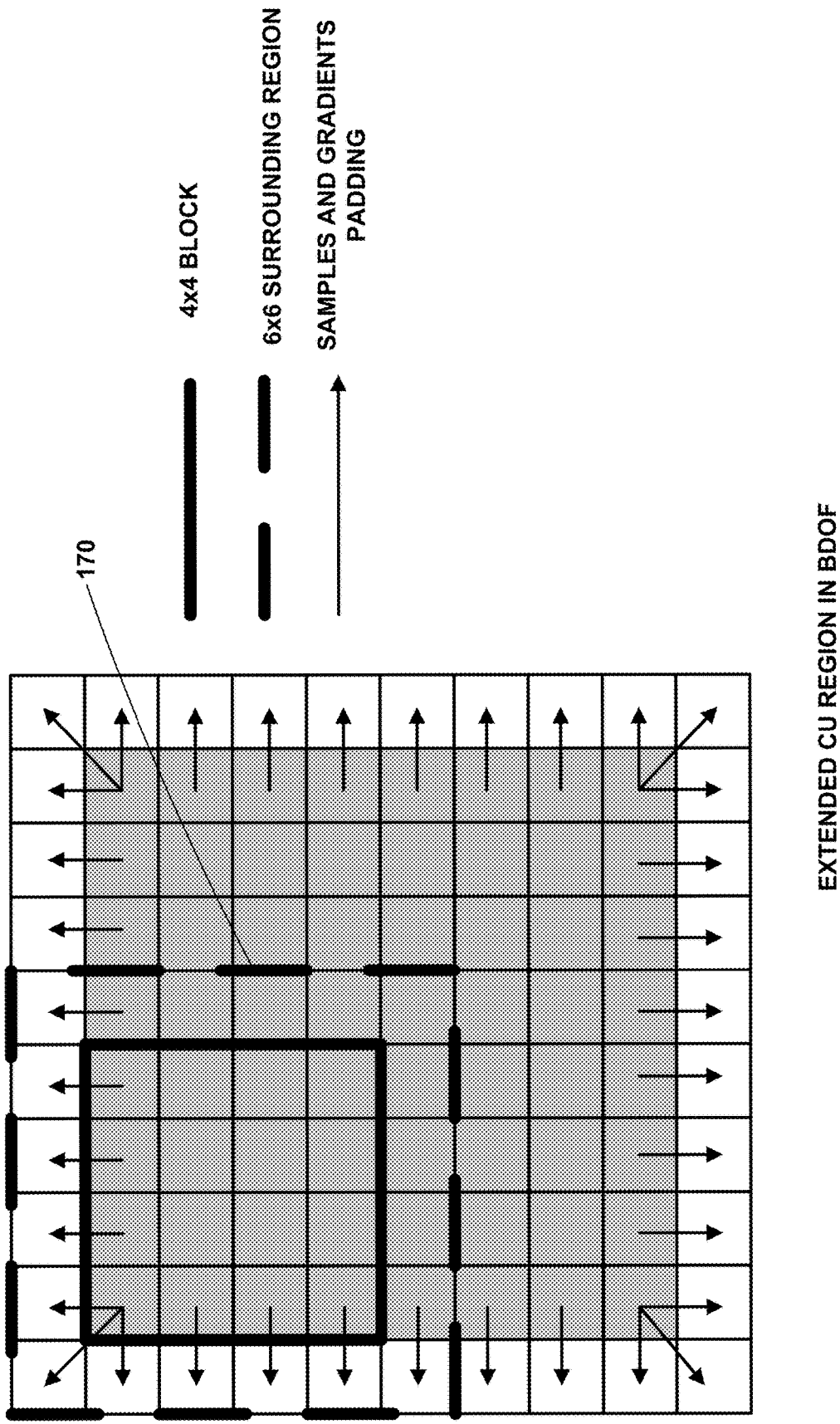
FIG. 7 is a conceptual diagram illustrating an extended CU region used in bi-directional optical flow (BDOF).

FIG. 7 is a conceptual diagram illustrating an extended CU region 170 used in bi-directional optical flow (BDOF). Bi-directional optical flow (BDOF) is used to refine the bi-prediction signal of luma samples in a CU at the 4×4 sub-block level. As its name indicates, the BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j),$$

$k=0,1$, of the two prediction signals are computed by directly calculating the difference between two neighboring samples, i.e., $$\frac{\partial I^{(k)}}{\partial x}(i, j) = (I^{(k)}(i+1, j) \gg \text{shift1}) - (I^{(k)}(i-1, j) \gg \text{shift1})$$

$$\frac{\partial I^{(k)}}{\partial y}(i, j) = (I^{(k)}(i, j+1) \gg \text{shift1}) - (I^{(k)}(i, j-1) \gg \text{shift1})$$

where $I^{(k)}(i,j)$ are the sample value at coordinate $(i,j)$ of the prediction signal in list k, $k=0,1$, and shift1 is calculated based on the luma bit depth, bitDepth, as shift1 is set to be equal to 6.

Then, the auto- and cross-correlation of the gradients, $S_1$, $S_2$, $S_3$, $S_5$ and $S_6$, are calculated as $$S_1 = \sum_{(i,j) \in \Omega} |\psi_x(i, j)|, S_3 = \sum_{(i,j) \in \Omega} \theta(i, j) \cdot (-\text{sign}(\psi_x(i, j)))$$

$$S_2 = \sum_{(i,j) \in \Omega} \psi_x(i, j) \cdot \text{sign}(\psi_y(i, j))$$

$$S_5 = \sum_{(i,j) \in \Omega} |\psi_y(i, j)| \; S_6 = \sum_{(i,j) \in \Omega} \theta(i, j) \cdot (-\text{sign}(\psi_y(i, j)))$$

$$\text{where } \psi_x(i, j) = \left(\frac{\partial I^{(1)}}{\partial x}(i, j) + \frac{\partial I^{(0)}}{\partial x}(i, j)\right) \gg \text{shift3}$$

$$\psi_y(i, j) = \left(\frac{\partial I^{(1)}}{\partial y}(i, j) + \frac{\partial I^{(0)}}{\partial y}(i, j)\right) \gg \text{shift3}$$

$$\theta(i, j) = (I^{(0)}(i, j) \gg \text{shift2}) - (I^{(1)}(i, j) \gg \text{shift2})$$

where $\Omega$ is a 6×6 window (surrounding extended CU region 170) around the 4×4 sub-block, the value of shift2 is set to be equal to 4, and the value of shift3 is set to be equal to 1.

The motion refinement $(v_x, v_y)$ is is then derived using the cross- and auto-correlation terms using the following:

$$v_x = S_1 > ?\text{clip3}(-th'_{BIO}, th'_{BIO}, -((S_3 \ll 2) \gg \lfloor \log_2 S_1 \rfloor)):0$$

$v_y = S_5 > ?\text{clip3}(-th'_{BIO}, th'_{BIO}, -((S_6 << 2) = ((v_x \cdot S_2) >> 1)) >> \lfloor \log_2 S_5 \rfloor)) : 0$ Where, $th'_{BIO} = 1 << 4$. $\lfloor \cdot \rfloor$ is the floor function.

Based on the motion refinement and the gradients, the following adjustment is calculated for each sample in the 4×4 sub-block:

$$b(x, y) = v_x \cdot \left( \frac{\partial I^{(1)}(x, y)}{\partial x} - \frac{\partial I^{(0)}(x, y)}{\partial x} \right) + v_y \cdot \left( \frac{\partial I^{(1)}(x, y)}{\partial y} - \frac{\partial I^{(0)}(x, y)}{\partial y} \right)$$

Finally, the BDOF samples of the CU are calculated by adjusting the bi-prediction samples as follows:

$$\text{pred}_{BDOF}(x, y) = (I^{(0)}(x, y) + I^{(1)}(x, y) + b(x, y) + i_{offset}) >> \text{shift5}$$

where shift5 is set equal to Max(3, 15−BitDepth) and the variable $o_{offset}$ is set equal to (1<<(shift5−1)).

These values are selected such that the multipliers in the BDOF process do not exceed 15-bit, and the maximum bit-width of the intermediate parameters in the BDOF process is kept within 32-bit.

In order to derive the gradient values, some prediction samples $I^{(k)}(i, j)$ in list k (k=0,1) outside of the current CU boundaries need to be generated. As depicted in FIG. 6, BDOF uses one extended row/column around the CU's boundaries. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e., repeated) from their nearest neighbors.

BDOF is used to refine the bi-prediction signal of a CU at the 4×4 subblock level. Per VVC, BDOF is applied to a CU if it satisfies all the following conditions: the CU is coded using "true" bi-prediction mode, i.e., one of the two reference pictures is prior to the current picture in display order and the other is after the current picture in display order, the CU is not coded using affine mode or the SbTMVP merge mode, the CU has more than 64 luma samples, both CU height and CU width are larger than or equal to 8 luma samples, BCW weight index indicates equal weight, WP is not enabled for the current CU, and CIIP mode is not used for the current CU.

Figure 8:
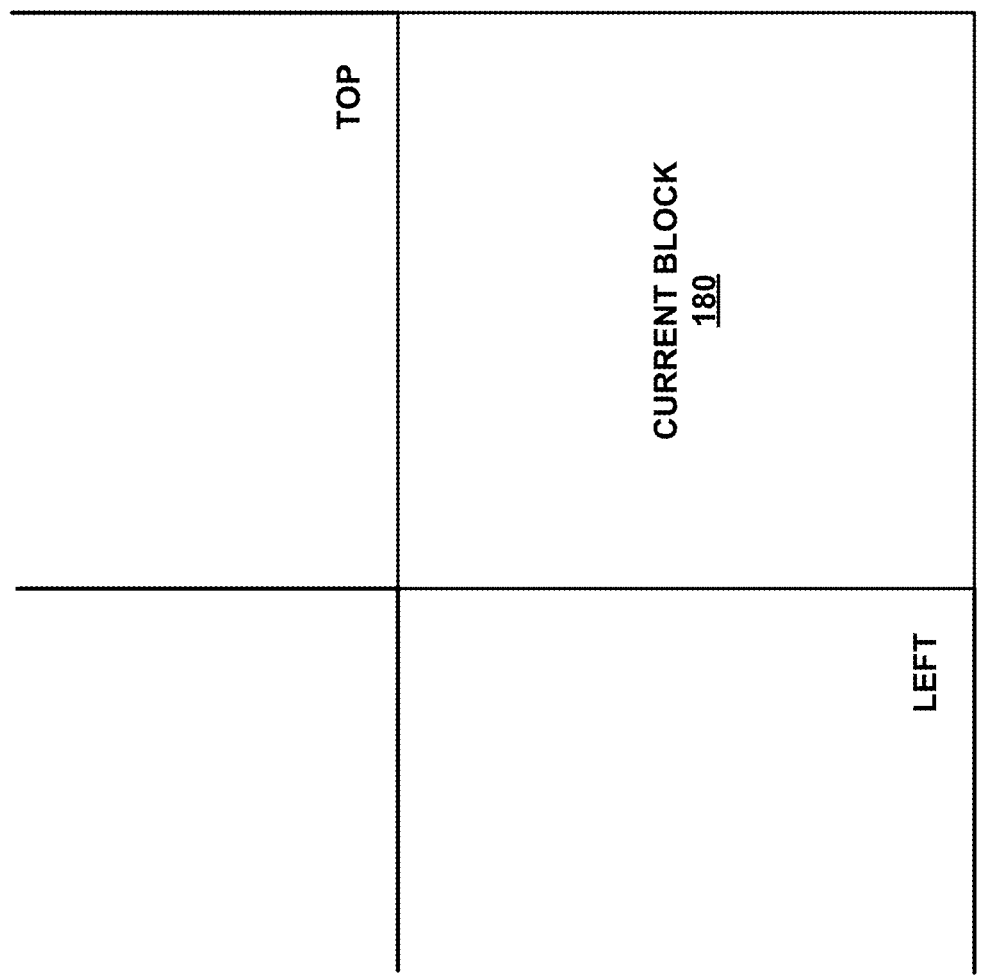
FIG. 8 is a conceptual diagram illustrating top and left neighboring blocks used in combined inter-intra prediction (CIIP) weight derivations.

FIG. 8 is a conceptual diagram illustrating top and left neighboring blocks used in combined inter-intra prediction (CIIP) weight derivations. In VVC, when a CU, such as current block 180, is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal for current block 180 in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in FIG. 8) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CIIP prediction is formed as follows:

$$P_{CIIP} = ((4-wt)*P_{inter} + wt*P_{intra} + 2) >> 2$$

The Enhanced Compression Model is being developed under coordinated exploration study by the Joint Video Exploration Team (JVET) of ITU-T VCEG and ISO/IEC MPEG as a potential enhanced video coding technology beyond the capabilities of VVC. The following describes new inter prediction coding tools of ECM when compares to the VVC.

Local illumination compensation (LIC) is an inter prediction technique to model local illumination variation between current block and its prediction block as a function of that between current block template and reference block template. The parameters of the function can be denoted by a scale α and an offset β, which forms a linear equation, that is, α*p[x]+β to compensate illumination changes, where p[x] is a reference sample pointed to by MV at a location x on reference picture. Since α and β can be derived based on current block template and reference block template, no signaling overhead is required for them, except that an LIC flag is signaled for AMVP mode to indicate the use of LIC.

The local illumination compensation proposed in JVET-O0066 is used for uni-prediction inter CUs with the following modifications: intra neighbor samples can be used in LIC parameter derivation; LIC is disabled for blocks with less than 32 luma samples; for both non-subblock and affine modes, LIC parameter derivation is performed based on the template block samples corresponding to the current CU, instead of partial template block samples corresponding to first top-left 16×16 unit; and samples of the reference block template are generated by using MC with the block MV without rounding it to integer-pel precision.

Figure 9:
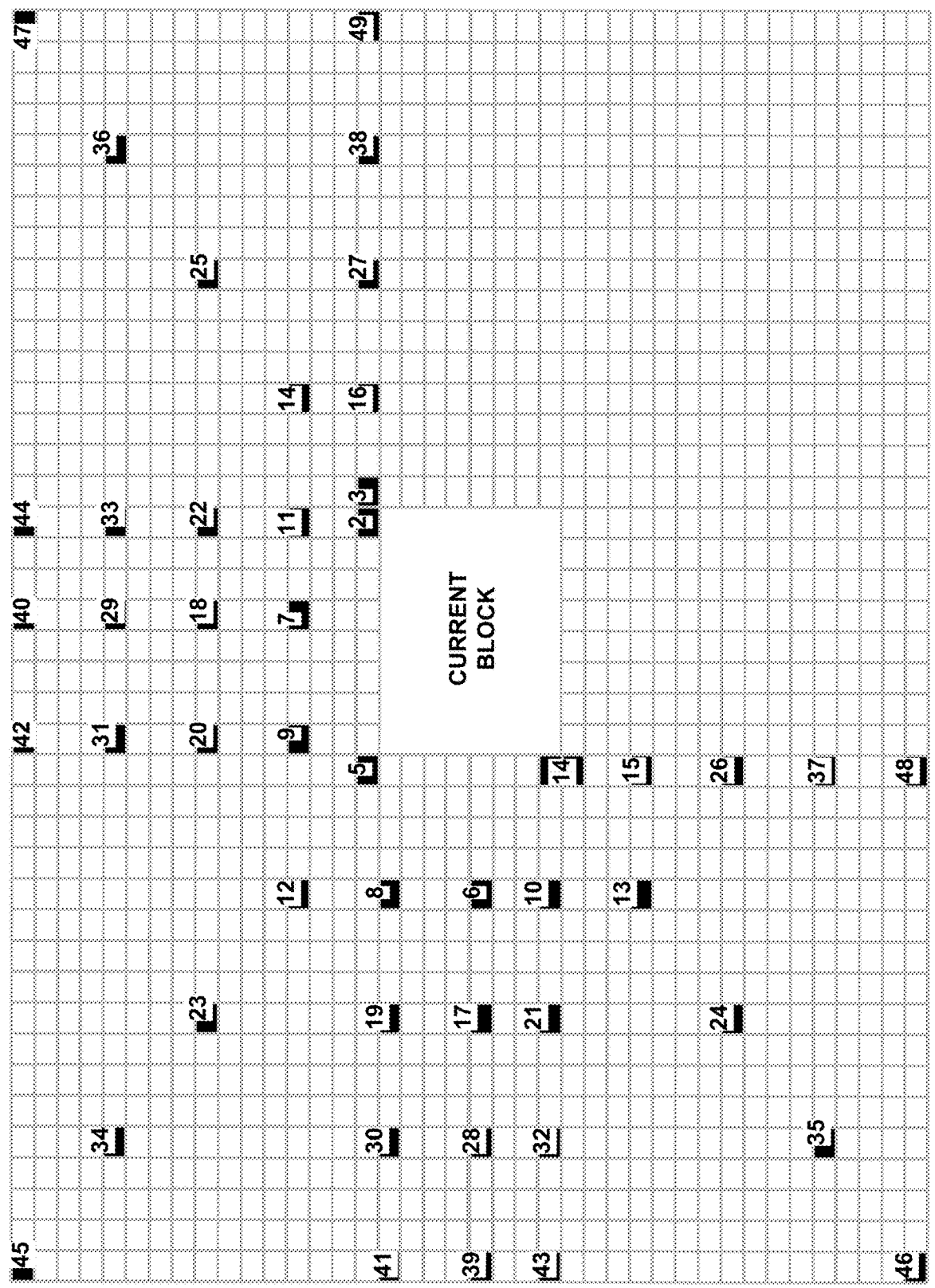
FIG. 9 is a conceptual diagram illustrating adjacent and non-adjacent spatial neighboring blocks used to derive spatial merge candidates.

FIG. 9 is a conceptual diagram illustrating adjacent and non-adjacent spatial neighboring blocks used to derive spatial merge candidates. The non-adjacent spatial merge candidates as in JVET-L0399 are inserted after the TMVP in the regular merge candidate list. The pattern of spatial merge candidates is shown in FIG. 9. The distances between non-adjacent spatial candidates and current coding block are based on the width and height of current coding block. The line buffer restriction is not applied.

Figure 10:
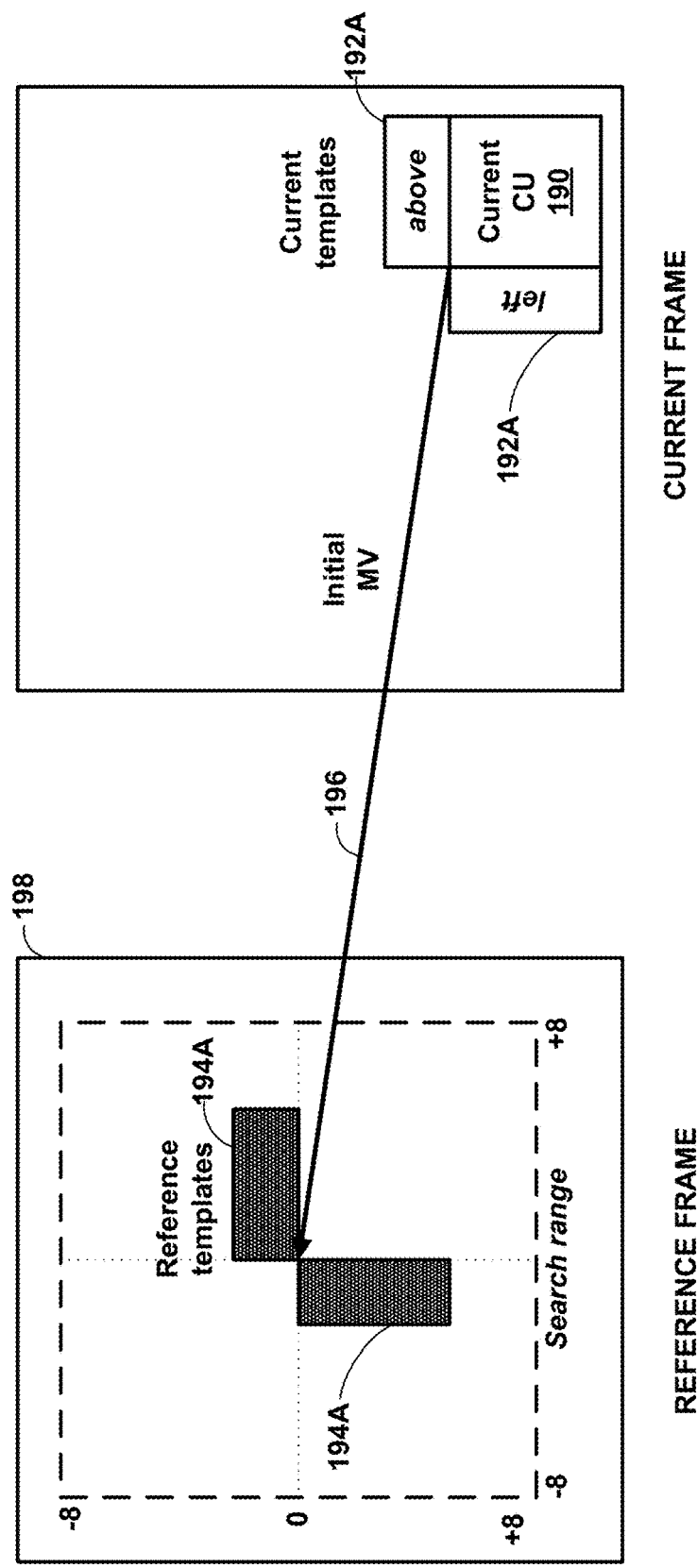
FIG. 10 is a conceptual diagram illustrating a template matching process performed on a search area around an area identified by an initial motion vector.

FIG. 10 is a conceptual diagram illustrating a template matching process performed on a search area around an area identified by an initial motion vector. Template matching (TM) is a decoder-side MV derivation method to refine the motion information of current CU 190 by finding the closest match between a template (i.e., above template block 192A and/or left neighbouring template block 192B to current CU 190) in the current picture and reference template blocks 194A, 194B to a block identified by initial motion vector 196 in reference picture 198, where reference template blocks 194A, 194B have the same size(s) as template blocks 192A, 192B. As illustrated in FIG. 10, a better MV is identified through a search around the initial motion of the current CU within a [31 8, +8]-pel search range. The template matching method in JVET-J0021 is used with the following modifications: search step size is determined based on AMVR mode and TM can be cascaded with bilateral matching process in merge modes.

In AMVP mode, an MVP candidate is determined based on template matching error to select the one which reaches the minimum difference between the current block template and the reference block template, and then TM is performed only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1. This search process ensures that the MVP candidate still keeps the same MV precision as indicated by the AMVR mode after TM process. In the search process, if the difference between the previous minimum cost and the current minimum cost in the iteration is less than a threshold that is equal to the area of the block, the search process terminates.

TABLE 1

Search patterns of AMVR and merge mode with AMVR

| Search pattern | AMVR mode | | | | Merge mode | |
| --- | --- | --- | --- | --- | --- | --- |
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, similar search method is applied to the merge candidate indicated by the merge index. As Table 1 shows, TM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

A multi-pass decoder-side motion vector refinement is applied in ECM. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

BM performs local search to derive integer sample precision intDeltaMV. The local search applies a 3×3 square search pattern to loop through the search range [−sHor, sHor] in horizontal direction and [−sVer, sVer] in vertical direction, where the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, MRSAD cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

The existing fractional sample refinement is further applied to derive the final deltaMV. The refined MVs after the first pass is then derived as:

MV0_pass1=MV0+deltaMV

MV1_pass1=MV1−deltaMV

Figure 11:
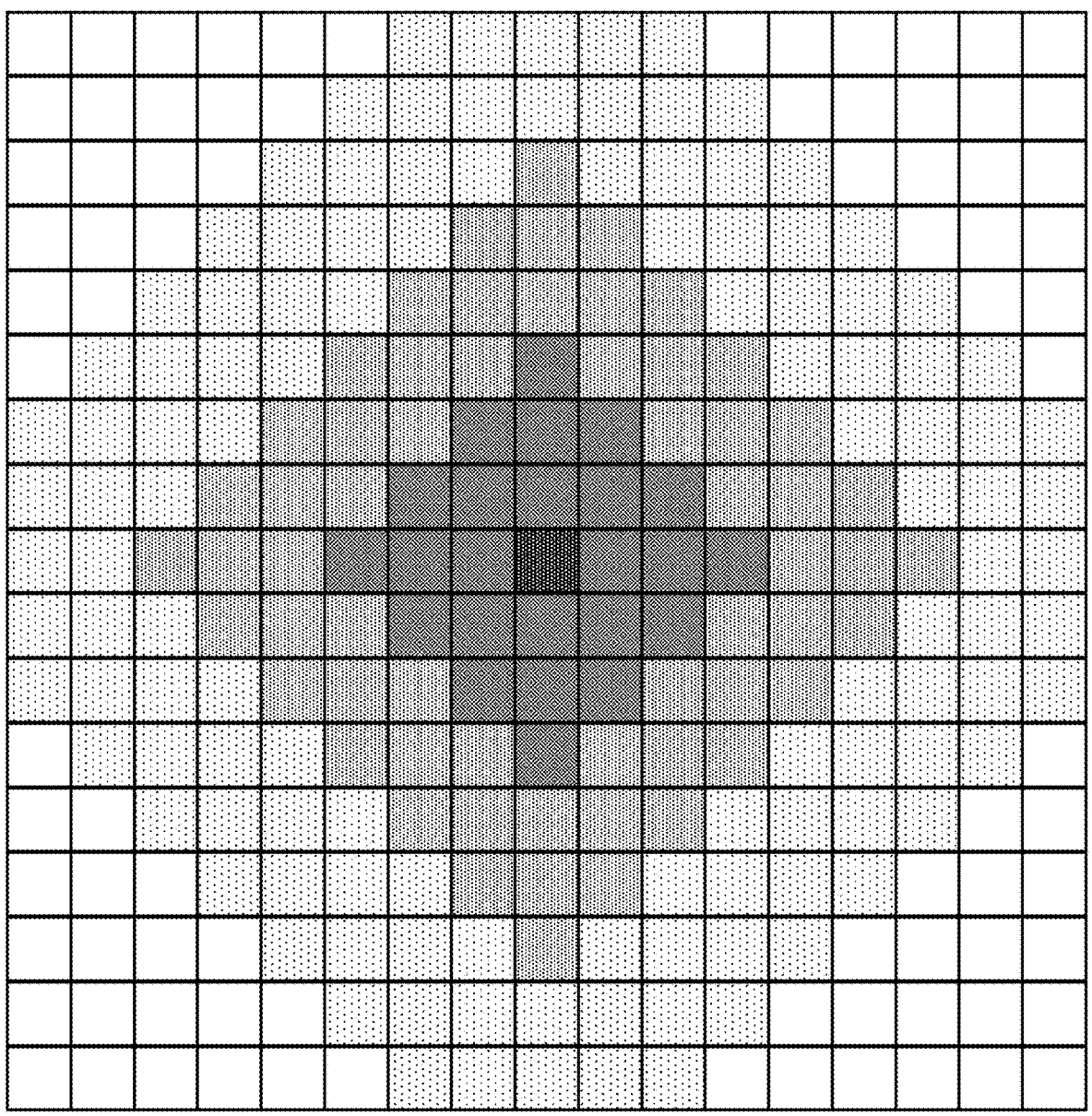
FIG. 11 is a conceptual diagram illustrating diamond regions in a search area for subblock-based bilateral matching motion vector refinement.

FIG. 11 is a conceptual diagram illustrating diamond regions in a search area for subblock-based bilateral matching motion vector refinement. In particular, this search area is used for the second pass of the BM process. In the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2(sbIdx2) and MV1_pass2 (sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in horizontal direction and [−sVer, sVer] in vertical direction, where the values of sHor and sVer are determined by the block dimension, and the maximum value of sHor and sVer is 8.

The bilateral matching cost is calculated by applying a cost factor to the SATD cost between two reference subblocks, as: bilCost'satdCost*costFactor. The search area (2*sHor+1) * (2*sVer+1) is divided up to 5 diamond shape search regions shown in FIG. 11. Each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW * sbH, the int-pel full search is terminated, otherwise, the int-pel full search continues to the next search region until all search points are examined. Additionally, if the difference between the previous minimum cost and the current minimum cost in the iteration is less than a threshold that is equal to the area of the block, the search process terminates.

The existing VVC DMVR fractional sample refinement is further applied to derive the final deltaMV(sbIdx2). The refined MVs at second pass is then derived as:

MV0_pass2(sbIdx2)=MV0_pass 1+deltaMV(sbIdx2)

MV1_pass2(sbIdx2)=MV1_pass1−deltaMV(sbIdx2)

In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to 1/16 sample precision and clipped between −32 and 32.

The refined MVs (MV0_pass3(sbdx3) and MV1_pass3 (sbIdx3)) at third pass are derived as:

MV0_pass3(sbIdx3)=MV0_pass2(sbIdx2)+bioMv

MV1_pass3(sbIdx3)=MV0_pass2(sbIdx2)−bioMv

Adaptive decoder side motion vector refinement method is an extension of multi-pass DMVR which includes the two new merge modes to refine MV only in one direction, either L0 or L1, of the bi prediction for the merge candidates that meet the DMVR conditions. The multi-pass DMVR process is applied for the selected merge candidate to refine the motion vectors, however either MVD0 or MVD1 is set to zero in the $1^{st}$ pass (i.e., PU level) DMVR.

The merge candidates for the new merge mode are derived from spatial neighboring coded blocks, TMVPs, non-adjacent blocks, HMVPs, pair-wise candidate, similar as in the regular merge mode. The difference is that only those meet DMVR conditions are added into the candidate list. The same merge candidate list is used by the two new merge modes. Merge index is coded as in regular merge mode.

When overlapped block motion compensation (OBMC) is applied, top and left boundary pixels of a CU are refined using motion information of the neighboring block with a weighted prediction as described in JVET-L0101. Conditions of not applying OBMC include: when OBMC is disabled at SPS level, when the current block has intra mode or IBC mode, when current block applies LIC, or when current luma block area is smaller or equal to 32.

A subblock-boundary OBMC is performed by applying the same blending to the top, left, bottom, and right subblock boundary pixels using neighboring subblocks' motion information. It is enabled for the subblock based coding tools: affine AMVP modes; affine merge modes and subblock-based temporal motion vector prediction (SbTMVP); and subblock-based bilateral matching.

When OBMC mode is used in CIIP mode with LMCS, inter blending is performed prior to LMCS mapping of inter samples. LMCS is applied to blended inter samples which are combined with LMCS applied intra samples in CIIP mode:

$$Inter'_{predY} = \frac{(128-w_1) \times Inter_{predY} + w_1 \times OBMC_{predY}}{128}$$

$$PredY = \frac{(4-w_0) \times FwdMap(Inter'_{predY}) + w_0 \times Intra_{predY}}{4}$$

where $Inter_{predY}$ represents the samples predicted by the motion of current block in the original domain, $Inter'_{predY}$ represents the samples predicted in the mapped domain, $OBMC_{predY}$ represents the samples predicted by the motion of neighboring blocks in the original domain, and $w_0$ and $w_1$ are the weights.

In the sample-based BDOF, instead of deriving motion vector refinement (Vx, Vy) on a block basis, it is performed per sample. The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive Vx and Vy. The derived motion refinement (Vx, Vy) is applied to adjust the bi-predicted sample value for the center sample of the window.

Figure 12:
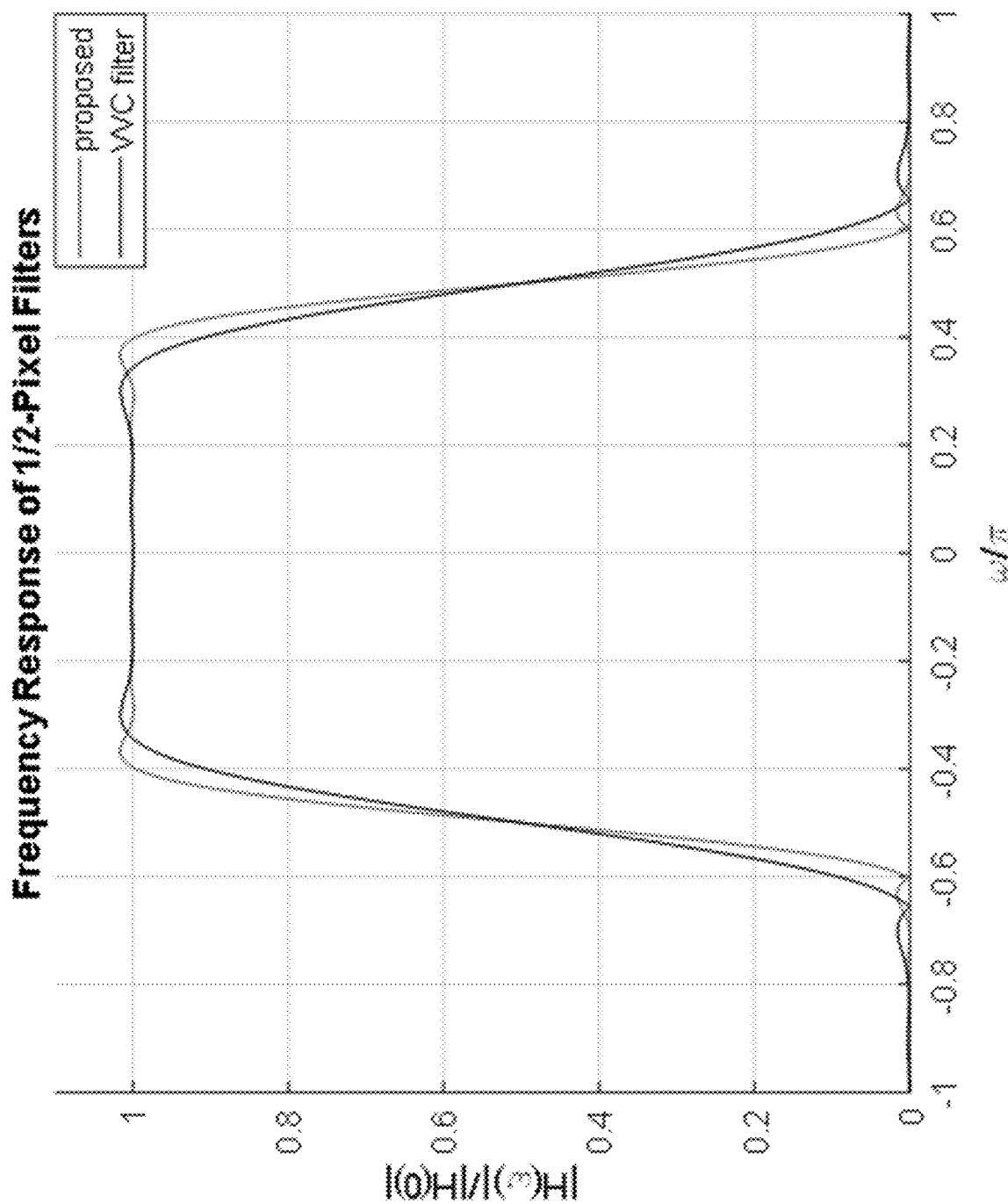
FIG. 12 is a graph illustrating a comparison of frequency responses of half-pel filters of VVC and a 12-tap filter.

FIG. 12 is a graph illustrating a comparison of frequency responses of half-pel filters of VVC and a 12-tap filter. The 8-tap interpolation filter used in VVC may be replaced with a 12-tap filter. The interpolation filter is derived from the sinc function of which the frequency response is cut off at Nyquist frequency, and cropped by a cosine window function. Table 2 gives the filter coefficients of all 16 phases. FIG. 12 compares the frequency responses of the interpolation filters with the VVC interpolation filter, all at half-pel phase.

TABLE 2

| | | | | | | | | | | | |
|---|---|---|---|---|---|---|---|---|---|---|---|
| 1/16 | −1 | 2 | −3 | 6 | −14 | 254 | 16 | −7 | 4 | −2 | 1 | 0 |
| 2/16 | −1 | 3 | −7 | 12 | −26 | 249 | 35 | −15 | 8 | −4 | 2 | 0 |
| 3/16 | −2 | 5 | −9 | 17 | −36 | 241 | 54 | −22 | 12 | −6 | 3 | −1 |
| 4/16 | −2 | 5 | −11 | 21 | −43 | 230 | 75 | −29 | 15 | −8 | 4 | −1 |
| 5/16 | −2 | 6 | −13 | 24 | −48 | 216 | 97 | −36 | 19 | −10 | 4 | −1 |
| 6/16 | −2 | 7 | −14 | 25 | −51 | 200 | 119 | −42 | 22 | −12 | 5 | −1 |
| 7/16 | −2 | 7 | −14 | 26 | −51 | 181 | 140 | −46 | 24 | −13 | 6 | −2 |
| 8/16 | −2 | 6 | −13 | 25 | −50 | 162 | 162 | −50 | 25 | −13 | 6 | −2 |
| 9/16 | −2 | 6 | −13 | 24 | −46 | 140 | 181 | −51 | 26 | −14 | 7 | −2 |
| 10/16 | −1 | 5 | −12 | 22 | −42 | 119 | 200 | −51 | 25 | −14 | 7 | −2 |
| 11/16 | −1 | 4 | −10 | 19 | −36 | 97 | 216 | −48 | 24 | −13 | 6 | −2 |
| 12/16 | −1 | 4 | −8 | 15 | −29 | 75 | 230 | −43 | 21 | −11 | 5 | −2 |
| 13/16 | −1 | 3 | −6 | 12 | −22 | 54 | 241 | −36 | 17 | −9 | 5 | −2 |
| 14/16 | 0 | 2 | −4 | 8 | −15 | 35 | 249 | −26 | 12 | −7 | 3 | −1 |
| 15/16 | 0 | 1 | −2 | 4 | −7 | 16 | 254 | −14 | 6 | −3 | 2 | −1 |

In multi-hypothesis inter-prediction mode (MHP) per JVET-M0425, one or more additional motion-compensated prediction signals are signaled, in addition to the conventional bi prediction signal. The resulting overall prediction signal is obtained by sample-wise weighted superposition. With the bi prediction signal $P_{bi}$ and the first additional inter prediction signal/hypothesis $h_3$, the resulting prediction signal $p_3$ is obtained as follows:

$$p_3 = (1-\alpha)p_{bi} + \alpha h_3$$

The weighting factor $\alpha$ is specified by the new syntax element add_hyp_weight_idx, according to the following mapping:

| add_hyp_weight_idx | $\alpha$ |
|---|---|
| 0 | 1/4 |
| 1 | −1/8 |

Analogously to above, more than one additional prediction signal can be used. The resulting overall prediction signal is accumulated iteratively with each additional prediction signal:

$$p_{n+1} = (1-\alpha_{n+1})p_n + \alpha_{n+1}h_{n+1}$$

The resulting overall prediction signal is obtained as the last $p_n$ (i.e., the $p_n$ having the largest index n). Within this EE, up to two additional prediction signals can be used (i.e., n is limited to 2).

The motion parameters of each additional prediction hypothesis can be signaled either explicitly by specifying the reference index, the motion vector predictor index, and the motion vector difference, or implicitly by specifying a merge index. A separate multi-hypothesis merge flag distinguishes between these two signalling modes.

For inter AMVP mode, MHP is only applied if non-equal weight in BCW is selected in bi-prediction mode.

Combination of MHP and BDOF is possible, however the BDOF is only applied to the bi-prediction signal part of the prediction signal (i.e., the ordinary first two hypotheses).

Figure 13:
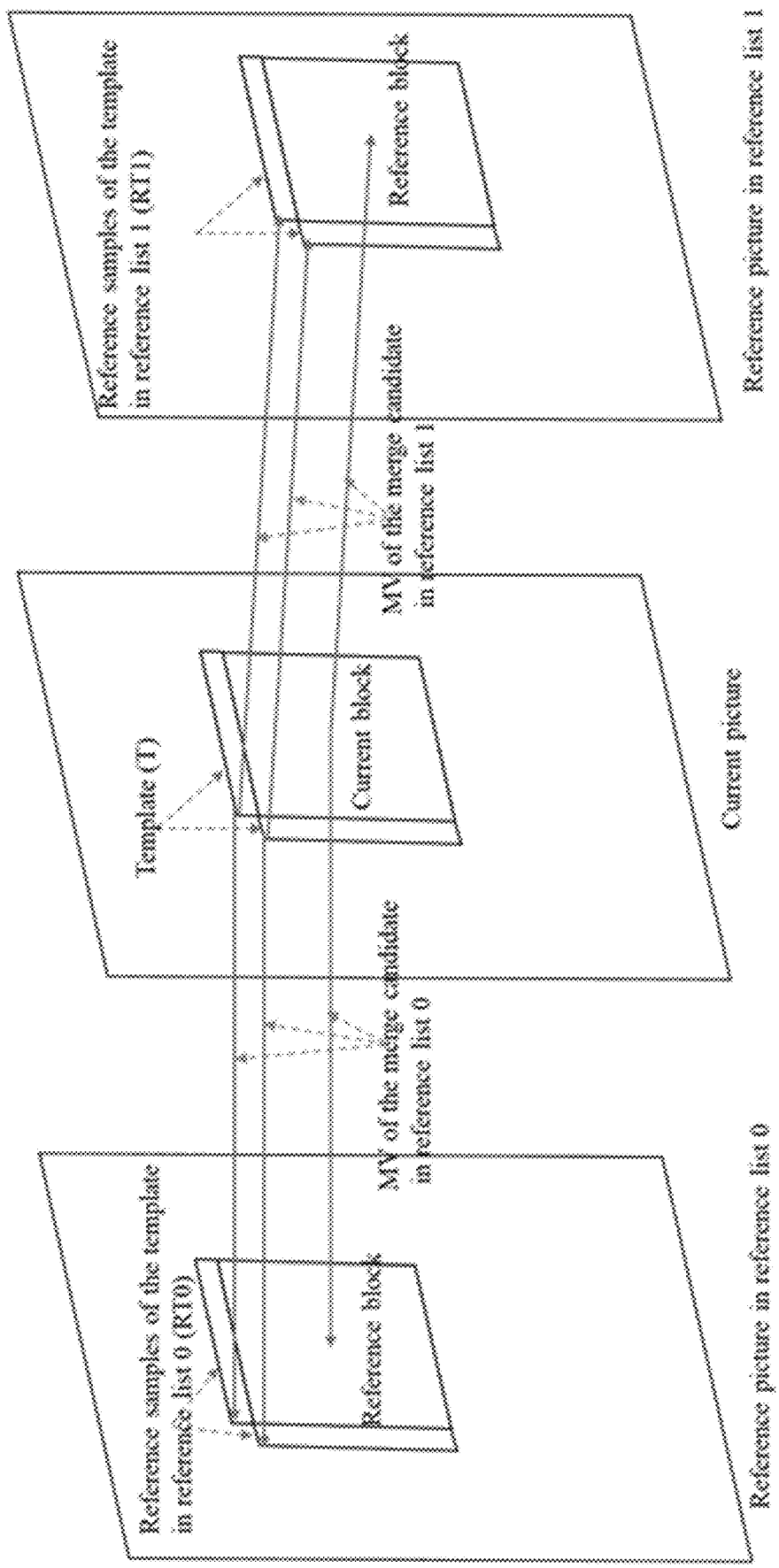
FIG. 13 is a conceptual diagram illustrating a template and reference samples of the template for adaptive reordering of merge candidates with template matching (ARMC-TM).

FIG. 13 is a conceptual diagram illustrating a template and reference samples of the template for adaptive reordering of merge candidates with template matching (ARMC-TM). The merge candidates in the merge candidate list may be adaptively reordered with template matching (TM). The reordering method is applied to regular merge mode, template matching (TM) merge mode, and affine merge mode (excluding the SbTMVP candidate). For the TM merge mode, merge candidates are reordered before the refinement process.

After a merge candidate list is constructed, merge candidates are divided into several subgroups. The subgroup size is set to 5 for regular merge mode and TM merge mode. The subgroup size is set to 3 for affine merge mode. Merge candidates in each subgroup are reordered ascendingly according to cost values based on template matching. For simplification, merge candidates in the last but not the first subgroup are not reordered.

The template matching cost of a merge candidate is measured by the sum of absolute differences (SAD) between samples of a template of the current block and their corresponding reference samples. The template comprises a set of reconstructed samples neighboring to the current block. Reference samples of the template are located by the motion information of the merge candidate.

When a merge candidate utilizes bi-directional prediction, the reference samples of the template of the merge candidate are also generated by bi-prediction as shown in FIG. 13.

Figure 14:
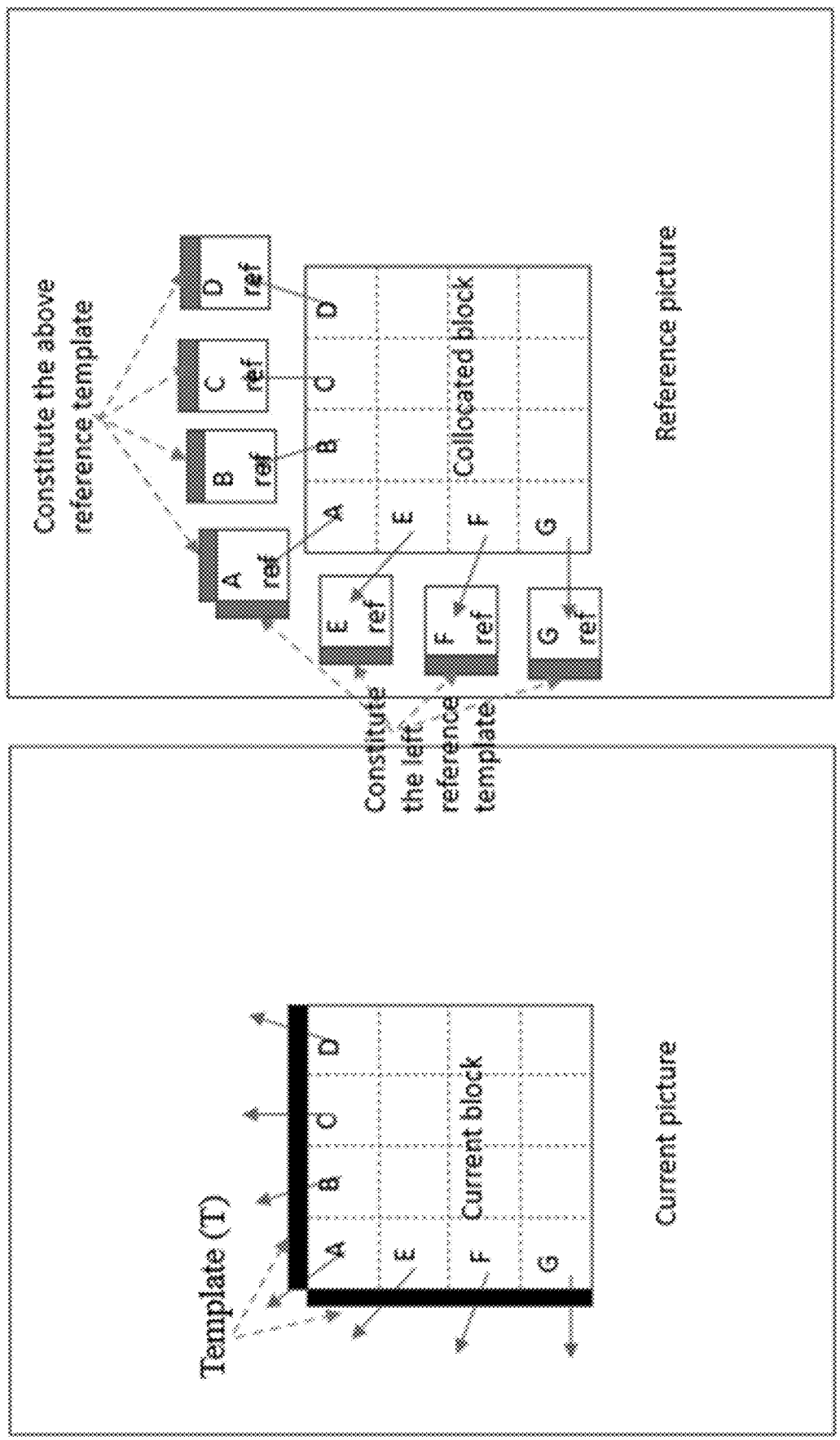
FIG. 14 is a conceptual diagram illustrating a template and reference samples of the template for a block with sub-block motion using the motion information of the sub-blocks of the current block.

FIG. 14 is a conceptual diagram illustrating a template and reference samples of the template for a block with sub-block motion using the motion information of the sub-blocks of the current block. For subblock-based merge candidates with subblock size equal to Wsub×Hsub, the template described with respect to FIG. 13 comprises several sub-templates with the size of Wsub×1, and the left template comprises several sub-templates with the size of 1×Hsub. As shown in FIG. 14, the motion information of the subblocks in the first row and the first column of current block is used to derive the reference samples of each sub-template.

Geometric partitioning mode (GMP) of VVC is extended in ECM by applying motion vector refinement on top of the existing GPM uni-directional MVs. A flag is first signalled for a GPM CU, to specify whether this mode is used. If the mode is used, each geometric partition of a GPM CU can further decide whether to signal MVD or not. If MVD is signalled for a geometric partition, after a GPM merge candidate is selected, the motion of the partition is further refined by the signalled MVDs information. All other procedures are kept the same as in GPM.

The MVD is signaled as a pair of distance and direction, similar as in MMVD. There are nine candidate distances (¼-pel, ½-pel, 1-pel, 2-pel, 3-pel, 4-pel, 6-pel, 8-pel, 16-pel), and eight candidate directions (four horizontal/vertical directions and four diagonal directions) involved in GPM with MMVD (GPM-MMVD). In addition, when pic_fpel_mmvd_enabled_flag is equal to 1, the MVD is left shifted by 2 as in MMVD.

Template matching is applied to GPM in ECM. When GPM mode is enabled for a CU, a CU-level flag is signaled to indicate whether TM is applied to both geometric partitions. Motion information for each geometric partition is refined using TM. When TM is chosen, a template is constructed using left, above or left and above neighboring samples according to partition angle, as shown in Table 3. The motion is then refined by minimizing the difference between the current template and the template in the reference picture using the same search pattern of merge mode with half-pel interpolation filter disabled.

TABLE 3

| Partition angle | 0 | 2 | 3 | 4 | 5 |
| --- | --- | --- | --- | --- | --- |
| 1st partition | A | A | A | A | L + A |
| 2nd partition | L + A | L + A | L + A | L | L |
| Partition angle | 8 | 11 | 12 | 13 | 14 |
| 1st partition | L + A | L + A | L + A | A | A |
| 2nd partition | L | L | L + A | L + A | L + A |
| Partition angle | 16 | 18 | 19 | 20 | 21 |
| 1st partition | A | A | A | A | L + A |
| 2nd partition | L + A | L + A | L + A | L | L |
| Partition angle | 24 | 27 | 28 | 29 | 30 |
| 1st partition | L + A | L + A | L + A | A | A |
| 2nd partition | L | L | L + A | L + A | L + A |

A GPM candidate list is constructed as follows: 1) Interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates. 2) Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates. 3) Zero MV candidates are padded until the GPM candidate list is full.

The GPM-MMVD and GPM-TM are exclusively enabled to one GPM CU. This is done by firstly signaling the GPM-MMVD syntax. When both two GPM-MMVD control flags are equal to false (i.e., the GPM-MMVD are disabled for two GPM partitions), the GPM-TM flag is signaled to indicate whether the template matching is applied to the two GPM partitions. Otherwise (at least one GPM-MMVD flag is equal to true), the value of the GPM-TM flag is inferred to be false.

ECM includes a bilateral matching AMVP-merge mode. The bi-directional predictor is composed of an AMVP predictor in one direction and a merge predictor in the other direction. The mode can be enabled to a coding block when the selected merge predictor and the AMVP predictor satisfy DMVR condition, where there is at least one reference picture from the past and one reference picture from the future relatively to the current picture and the distances from two reference pictures to the current picture are the same, the bilateral matching MV refinement is applied for the merge MV candidate and AMVP MVP as a starting point. Otherwise, if template matching functionality is enabled, template matching MV refinement is applied to the merge predictor or the AMVP predictor which has a higher template matching cost.

AMVP part of the mode is signaled as a regular uni-directional AMVP, i.e., reference index and MVD are signaled, and it has a derived MVP index if template matching is used or MVP index is signaled when template matching is disabled.

For AMVP direction LX, X can be 0 or 1, the merge part in the other direction (1−LX) is implicitly derived by minimizing the bilateral matching cost between the AMVP predictor and a merge predictor, i.e., for a pair of the AMVP and a merge motion vectors. For every merge candidate in the merge candidate list which has that other direction (1−LX) motion vector, the bilateral matching cost is calculated using the merge candidate MV and the AMVP MV. The merge candidate with the smallest cost is selected. The bilateral matching refinement is applied to the coding block with the selected merge candidate MV and the AMVP MV as a starting point.

The third pass of multi pass DMVR which is 8×8 sub-PU BDOF refinement of the multi-pass DMVR is enabled to AMVP-merge mode coded block.

The mode is indicated by a flag, if the mode is enabled AMVP direction LX is further indicated by a flag.

Figure 15:
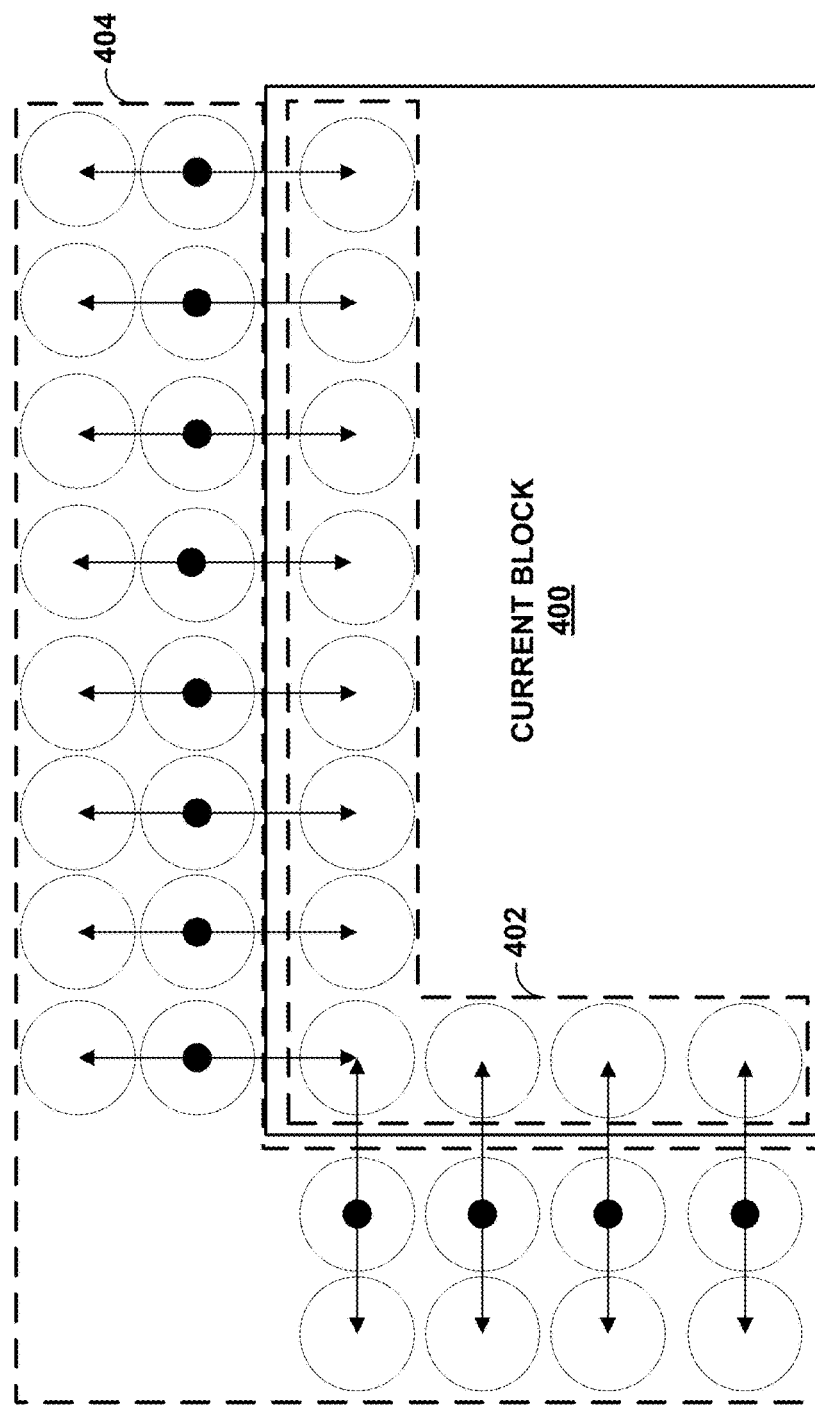
FIG. 15 is a conceptual diagram illustrating a discontinuity measure for sign data hiding.

FIG. 15 is a conceptual diagram illustrating a discontinuity measure for sign data hiding. The basic idea of the coefficient sign prediction method (JVET-D0031 and JVET-J0021) is to calculate a reconstructed residual for both negative and positive sign combinations for applicable transform coefficients of current block 400 and to select the hypothesis that minimizes a cost function.

To derive the best sign, the cost function is defined as discontinuity measure across a block boundary, as shown in FIG. 15. It is measured for all hypotheses, and the one with the smallest cost is selected as a predictor for coefficient signs. The cost function is defined as a sum of absolute second derivatives in the residual domain for the above row and left column as follows:

$$\text{cost} = \sum_{x=o}^{w} |(-R_{x,-1} + 2R_{x,0} - P_{x,1}) - r_{x,1}| + \sum_{y=o}^{h} |(-R_{-1,y} + 2R_{0,y} - P_{1,y}) - r_{1,y}|,$$

where R refers to reconstructed neighbors 404 for reconstructed sign candidates 402, P is prediction of current block 400, and r is the residual hypothesis. The term $(-R_1 + 2R_0 - P_1)$ can be calculated only once per block and only the residual hypothesis is subtracted.

JVET-K0363 describes motion compensated boundary pixel padding (MC padding) to replace repetitive boundary padding. A motion vector is first derived from the boundary 4×4 block inside the current frame. If the boundary 4×4 block is intra coded or the motion vector is not available, repetitive padding will be used. If the boundary 4×4 block is predicted using uni-directional inter prediction. The only motion vector within the block will be used for motion compensated boundary pixel padding. Using the position of the boundary 4×4 block and its motion vector, a corresponding starting position can be computed in the reference frame. From this starting position till the boundary of the reference slice in the given padding direction, a 4×M or M×4 image slip can be fetched where M is the distance between the horizontal/vertical coordinate of the boundary pixel position and the starting position depending on the padding direction. In case of bi-directional inter prediction, only the motion vector, which points to the pixel position farther away from the frame boundary in the reference slice in terms of the padding direction, is used in motion compensated boundary pixel padding. The difference between the DC values of the boundary 4×4 block in the current slice and its corresponding reference 4×4 block in the reference slice is used as the offset to filter the fetched motion compensated image slip before it is copied to the padding area beyond the image boundary.

Figure 16:
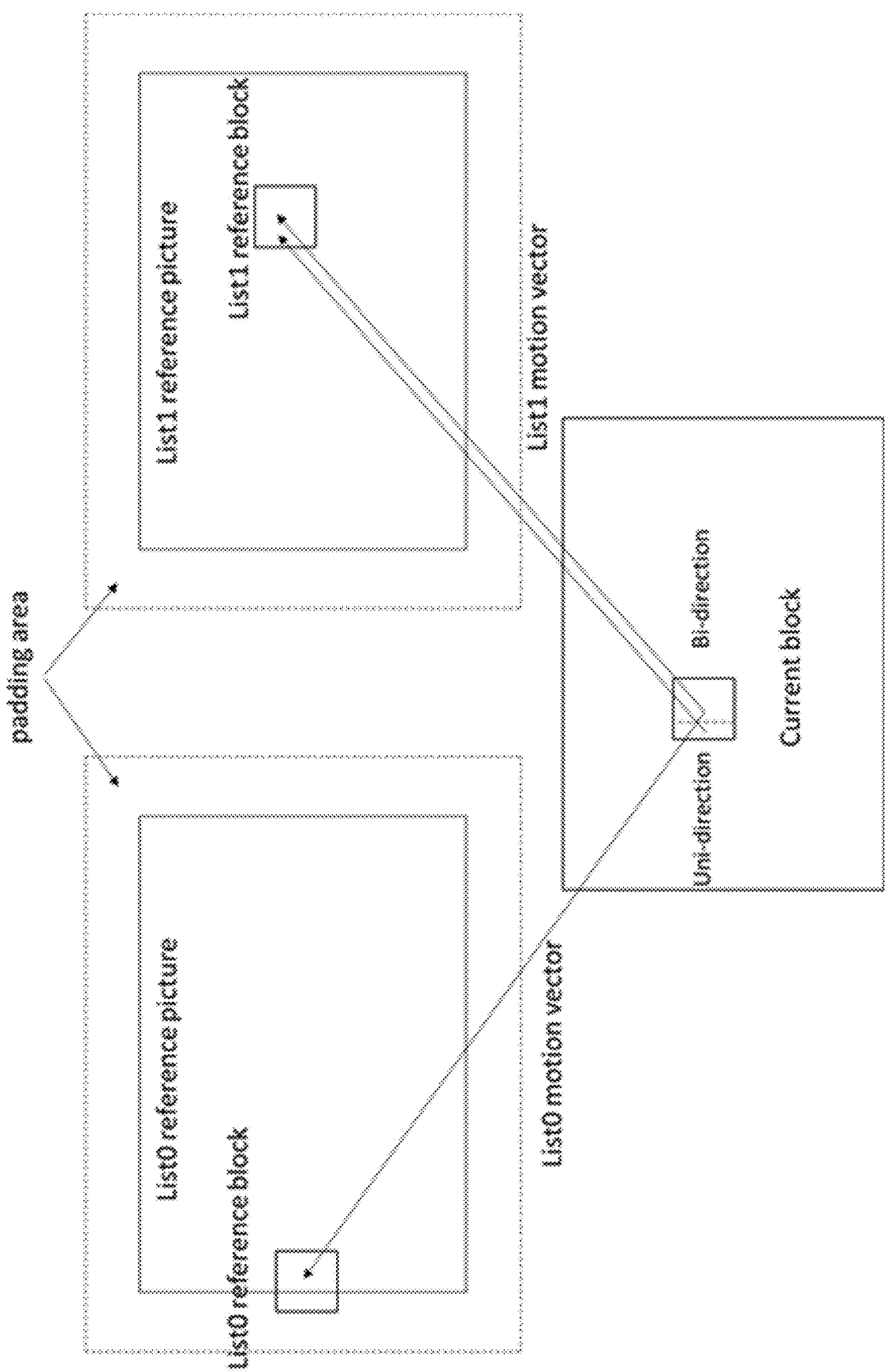
FIG. 16 is a conceptual diagram for bi-directional motion compensated prediction including an out-of-bound region.

FIG. 16 is a conceptual diagram for bi-directional motion compensated prediction including an out-of-bound region. JVET-Y0125 describes a method to handle the out of the boundary (OOB) motion vectors when one of the motion vectors in bi-directional prediction is out of the picture boundary. The motion compensation (MC) predictors generated using the OOB reference samples are less effective. When combining more than one prediction blocks generated by the motion compensation process, the OOB predictors are discarded and only the non-OOB predictors are used to generate the final predictor.

To be specific, the positions of the predictors within the current block are denoted as $\text{Pos\_x}_{i,j}$ and $\text{Pos\_y}_{i,j}$, the MV of the current block are denoted as $\text{Mv\_x}_{i,j}^{L,x}$ and $\text{Mv\_y}_{i,j}^{L,x}$ (x could be 0 or 1 for list 0 and list1, respectively). $\text{Pos}_{LeftBdry}$, $\text{Pos}_{RightBdry}$, $\text{Pos}_{TopBdry}$, $\text{Pos}_{BottomBdry}$ are the positions of four boundaries of a picture. The predictor $P_{i,j}^{L,x}$ is regarded as OOB when at least one of the following conditions holds:

$$(\text{Pos\_x}_{i,j} + \text{Mv\_x}_{i,j}^{L,x}) > (\text{Pos}_{RightBdry} + \text{half\_pixel}),$$

$$\text{Pos\_x}_{i,j} + \text{Mv\_x}_{i,j}^{L,x}) < (\text{Pos}_{LeftBdry} - \text{half\_pixel}),$$

$$\text{Pos\_y}_{i,j} + \text{Mv\_y}_{i,j}^{L,x}) > (\text{Pos}_{BottomBdry} + \text{half\_pixel}), \text{ or}$$

$$\text{Pos\_y}_{i,j} + \text{Mv\_y}_{i,j}^{L,x}) < (\text{Pos}_{TopBdry} - \text{half\_pixel}),$$

Otherwise, when none of the above conditions holds, the predictor $P_{i,j}^{L,x}$ is regarded as non-OOB.

As illustrated in FIG. 16, after the OOB condition is determined for each predictor, the proposed scheme is applied to the bi-directional MC blocks to generate the final predictors where the following procedures are deployed:

If $P_{i,j}^{L0}$ is OOB and $P_{i,j}^{L1}$ is non-OOB
    $P_{i,j}^{final} = P_{i,j}^{L1}$
else if $P_{i,j}^{L0}$ is non-OOB and $P_{i,j}^{L1}$ is OOB
    $P_{i,j}^{final} = P_{i,j}^{L0}$
else
    $P_{i,j}^{final} = (P_{i,j}^{L0} + P_{i,j}^{L1} + 1) >> 1$ Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode is signalled with a flag and it can be signaled as IBC AMVP mode or IBC skip/merge mode as follows:

IBC skip/merge mode: a merge candidate index is used to indicate which of the block vectors in the list from neighboring candidate IBC coded blocks is used to predict the current block. The merge list include spatial, HMVP, and pairwise candidates.

IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

This disclosure recognizes that, for motion compensation (MC) boundary padding as discussed above, when a boundary block is bi-directional inter predicted block, only the motion vector that points to the pixel position farther away from the frame boundary in the reference slice in term of the padding direction is used in MC boundary padding. The temporal information in the other motion vector is not used in deriving padding pixel process. This disclosure recognizes that using the other motion vector may improve prediction from the padding values, which may reduce residual values and, thus, reduce overall bitrate of the bitstream.

Furthermore, this disclosure recognizes that, for OOB bi-directional prediction method in JVET-Y0125, when the OOB condition is fulfilled, the padded pixel is completely ignored in the bi-directional prediction motion compensation process. However, when the padded pixel is generated by using the techniques discussed above, using the padded pixel or partial of the padded pixel for bi-directional prediction may yield a better prediction result, compared to using only the non-OOB part.

Furthermore, this disclosure recognizes that techniques have not yet defined how to derive the MC padding block, when a boundary block is coded as IBC mode.

Video encoder 200 and video decoder 300 may be configured to perform the various techniques of this disclosure described below for calculating padding values using bi-directional motion, alone or in any combination. These techniques may address the various problems recognized above.

Figure 17:
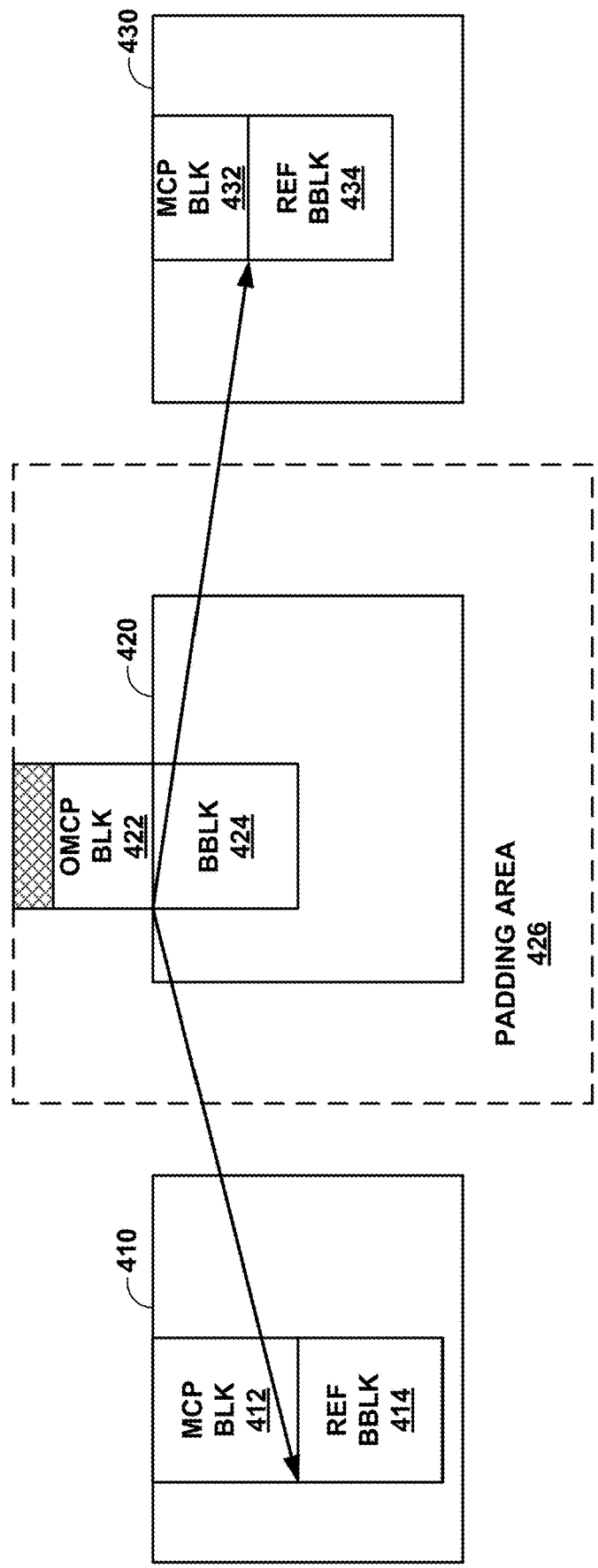
FIG. 17 is a conceptual diagram illustrating bi-directional prediction motion compensation padding according to techniques of this disclosure.

FIG. 17 is a conceptual diagram illustrating bi-directional prediction motion compensation padding according to techniques of this disclosure. In some examples, when a boundary block (BBLK), such as BBLK 424 of current picture 420, is a bi-directional inter predicted block, both motion vectors are used in the motion compensation (MC) process to derive the padding pixel values of padding area 426.

As in FIG. 17, when BBLK 424 is a bi-directional inter predicted block, the two motion vectors (MV) point to two positions (REF BBLKs 414, 434) of different reference pictures 410, 430 or two positions (reference blocks) at the same reference picture. MC padding block (MCP BLK) 412 has pixels that are derived by MC using the first MV of BBLK 424, referring to REF BBLK 414. The dimensions of MCP BLK 412 are W1×H1. MCP BLK 432 has pixels that is derived by MC using the second MV of BBLK 424, referring to REF BBLK 434. The dimensions of MCP BLK 432 are W2×H2. A final MC padding block is derived by using MCP BLK 412 and/or MCP BLK 432. The dimension of the final MC padding block is W×H. The pixels in overlap MC padding block (OMCP BLK 422) are derived by using both MCP BLK 412 and MCP BLK 432, whereas the pixels in the rest of the final MC padding block are derived by only using one of MCP BLK 412 or MCP BLK 432. The dimension of OMCP BLK 422 is equal or smaller than the dimension of the final MC padding block in terms of horizontal and vertical directions.

Figure 18:
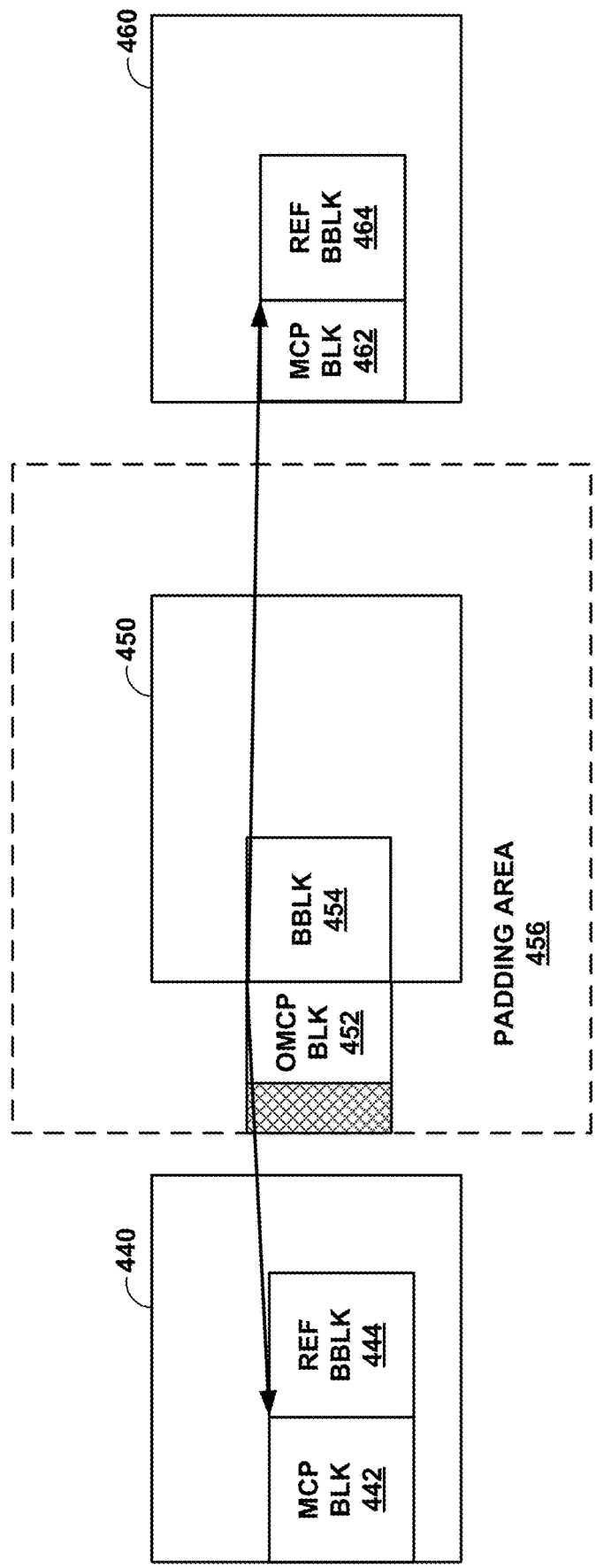
FIG. 18 is a conceptual diagram illustrating an example of bi-directional prediction motion compensated padding according to techniques of this disclosure.

FIG. 18 is a conceptual diagram illustrating an example of bi-directional prediction motion compensated padding according to techniques of this disclosure. In some examples, padding area 456 in current picture 450 is derived by MC padding in eight directions: left, right, top, bottom, top-left, top-right, bottom-left, and bottom-right. For padding direction of left, right, top and bottom, BBLK 454 is an M×N block along the picture boundary. For padding direction of top-left, top-right, bottom-left and bottom-right, a BBLK is a M×N block at the corner of the current picture. In one example, N is equal to M, and N is equal to 4.

For left, right, top and bottom direction padding, when BBLK 454 is an inter bi-directional predicted block, the dimension of MCP BLK 442 is W1×H1, where MCP BLK 442 neighbors REF BBLK 444 in reference picture 440 in the same direction as OMCP BLK 452 to BBLK 454, and REF BBLK 444 is identified by a motion vector of BBLK 454. The value of W1 and H1 is determined by the padding direction and the top-left position of REF BBLK 444 to the picture boundary of reference picture 440 as follows:

Left padding: H1 is equal to N, W1 is equal to (horizontal distance between TL of REF BBLK 444 to left boundary).

Right padding: H1 is equal to N, W1 is equal to ((horizontal distance between TL of REF BBLK 444 to right boundary)−M).

Top padding: W1 is equal to M, H1 is equal to (vertical distance between TL of REF BBLK 444 to above boundary).

Right padding: W1 is equal to M, H1 is equal to ((vertical distance between TL of REF BBLK 444 to bottom boundary)−N).

The dimension of MCP BLK 462 is W2×H2, where MCP BLK 462 neighbors REF BBLK 464 in reference picture 460 in the same direction as OMCP BLK 452 to BBLK 454, and REF BBLK 464 is identified by a second motion vector of BBLK 454. The value of W2 and H2 is determined by the padding direction and the top-left position of REF BBLK 464 to the picture boundary of reference picture 460 in a similar way as W1 and H1.

The dimension of a final MC padding block is W×H. The value of W is the larger of W1 and W2. The value of H is the larger of H1 and H2.

For top-left, top-right, bottom-left and bottom-right direction padding, when BLK 452 is an inter block, the dimension of MCP BLK 442 is W1×H1. The value of W1 and H1 is determined by the padding direction and the top-left position of a first REF BBLK 444 to the picture boundary as follows:

Top-left padding: W1 is equal to (horizontal distance between TL of REF BBLK 444 to left boundary), H1 is equal to (vertical distance between TL of REF BBLK 444 to top boundary).

Top-right padding: W1 is equal to ((horizontal distance between TL of REF BBLK 444 to right boundary)−M), H1 is equal to (vertical distance between TL of REF BBLK 444 to top boundary).

Bottom-left padding: W1 is equal to (horizontal distance between TL of REF BBLK 444 to left boundary), H1 is equal to ((vertical distance between TL of REF BBLK 444 to above boundary)−N).

Bottom-right padding: W1 is equal to ((horizontal distance between TL of REF BBLK 444 to right boundary) −M), H1 is equal to ((vertical distance between TL of REF BBLK 444 to bottom boundary)−N).

The dimension of MCP BBLK 462 is W2×H2. The value of W2 and H2 is determined by the padding direction and the top-left position of a second REF BBLK 464 to the picture boundary of reference picture 460 in a similar way as W1 and H1.

The dimension of the final MC padding block is W×H. In one example, the value of W is equal to the larger of W1 and W2, the value of H is equal to the larger of H1 and H2.

Figure 19:
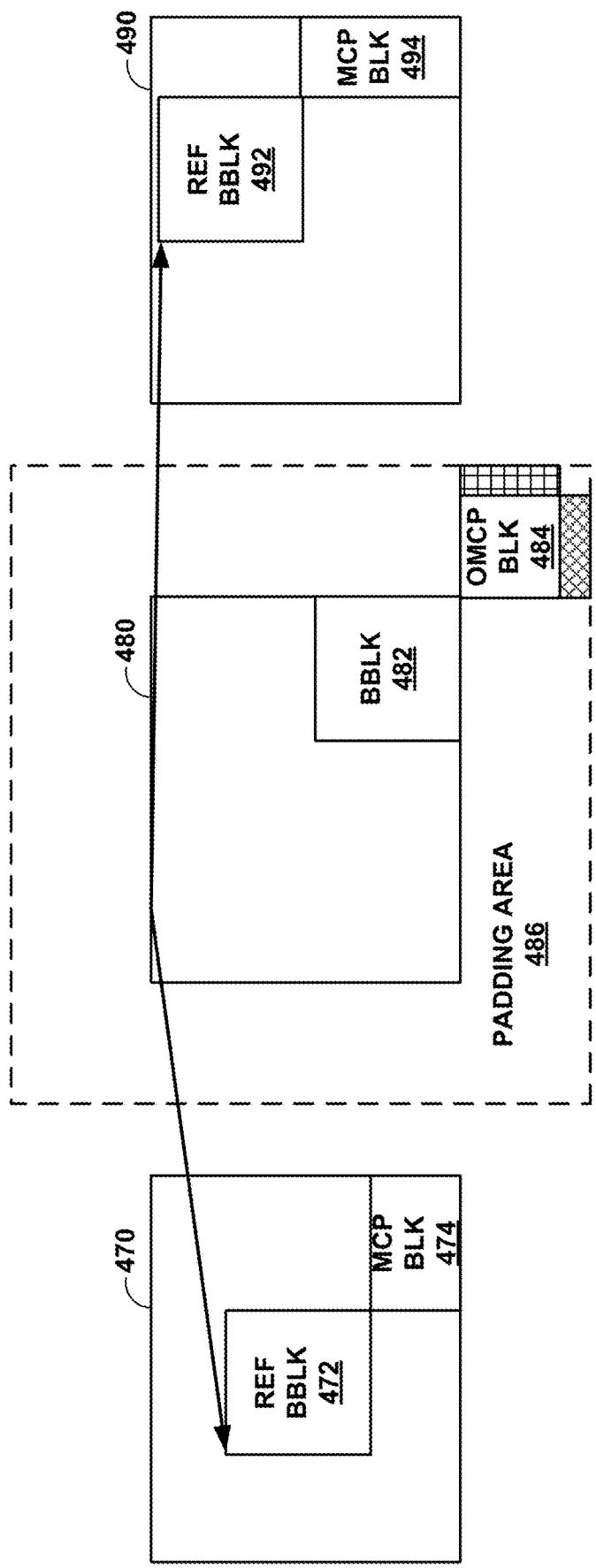
FIG. 19 is a conceptual diagram illustrating an example of bi-directional prediction motion compensated padding according to techniques of this disclosure.

FIG. 19 is a conceptual diagram illustrating an example of bi-directional prediction motion compensated padding according to techniques of this disclosure. In general, when a current block is at a corner of current picture 480, such as BBLK 482, an OMCP BLK 484 may be determined to add padding pixel values to padding are 486 in the direction of the corner touched by the current block. In particular, BBLK 482 is predicted using motion vectors referring to REF BBLK 472 in reference picture 470 and REF BBLK 492 in reference picture 490. Blocks positioned in the same direction as the corner BBLK 482 touches relative to REF BBLK 472 and REF BBLK 492, i.e., MCP BLK 474 and MCP BLK 494, may be used to form padding values for OMCP BLK 484.

MCP BLK 474 has dimensions of W1×H1, and MCP BLK 494 has dimensions of W2×H2. OMCP BLK 484 has dimensions of W×H, which may be determined as follows. In some examples, as in FIG. 19, when W1+H1 is equal to or larger than W2+H2, the value of W is equal to W1 and the value of H is equal to H1. Otherwise, when W1+H1 is smaller than W2+H2, the value of W is equal to W2 and the value of H is equal to H2. In other words, (W1>W2)? (W=W1) : (W=W2) and (H1>H2)? (H=H1) : (H=H2). FIG. 19 shows an example of bottom-right direction MC padding, where W2+H2 >W1+H1 and H2>K, therefore, W is equal to W2 and H is equal to K.

The values of W, W1, W2, H, H1, and H2 are in range of 0 to K, where K may be a predetermined value. In one example, K is equal to 64. In another example, K is equal to (maximum CU width/height)*factor, where maximum CU width/height is signaled in the bitstream. In yet another example, K is signaled in the bitstream. In one example, the values of W, W1, W2, H, H1 and H2 are set to be a multiple of minimum CU width/height, where the minimum CU width/height is predetermined to be equal to 4.

In some examples, video encoder 200 and video decoder 300 may derive pixel values in the motion compensated padding block using weighted bi-directional prediction. Video encoder 200 and video decoder 300 may derive the pixel in OMCP BLK 484 using a weighted combination of the pixels in MCP BLK 474 and MCP BLK 494. The pixels in non-overlap MC padding block (shaded in FIG. 19) may either be derived from MCP BLK 474 or MCP BLK 494. The pixels in MCP BLK 474 and MCP BLK 494 may be derived by MC using motion vectors MV1 and MV2 of BBLK 482 respectively.

In some examples, the pixels in OMCP BLK 484 are derived by averaging the pixels in MCP BLK 474 and MCP BLK 494.

In some examples, the BCW parameter in BBLK 482 is used as the weight factor of the pixel in MCP BLK 474 and MCP BLK 494.

In some examples, an offset value is added to each pixel in MCP BLK 474 and MCP BLK 494, where the pixel values are derived by MC.

In some examples, an offset value is added to the weighted result of pixel in MCP BLK 474 and pixel in MCP BLK 494, where the pixel values are derived by MC.

The offset value, in some examples, is the difference between the average pixel value of BBLK 482 and the average pixel value of REF BBLK 472 and/or REF BBLK 492.

Constraints may be imposed on bi-directional prediction decoder side motion refinement. For example, in VVC, when a high-level syntax flag indicates the decoder side motion vector refinement (DMVR) is used for the current picture, DMVR may be used for bi-directional motion vector refinement when the DMVR enabling conditions are fulfilled. Additionally, in VVC, when a high-level syntax flag indicates the bi-directional optical flow (BDOF) is used for the current picture, BDOF may be used for bi-directional motion refinement and luma sample value adjustment when the BDOF enabling conditions are fulfilled. In some examples, video encoder 200 and video decoder 300 may be configured to skip decoder side motion refinement or luma sample value adjustment when deriving pixels in MC boundary padding blocks by using bi-directional prediction. That is, video encoder 200 and video decoder 300 may skip BDOF and DMVR in the MC padding process, regardless of the high-level syntax flag or the enabling conditions for BDOF and DMVR.

Figure 20:
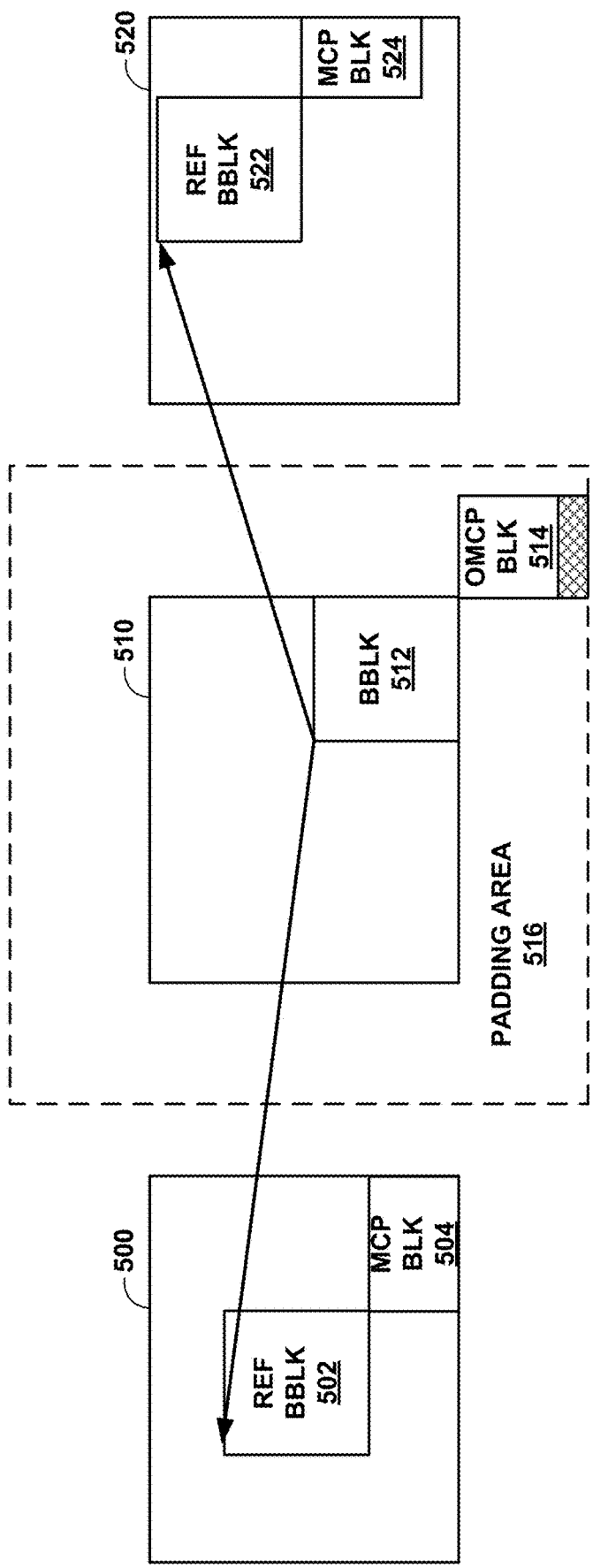
FIG. 20 is a conceptual diagram illustrating bi-directional prediction motion compensation padding according to techniques of this disclosure.

FIG. 20 is a conceptual diagram illustrating bi-directional prediction motion compensation padding according to techniques of this disclosure. In this example, values for padding area 516 around current picture 510 may be determined using corner-neighboring blocks to reference blocks of coded blocks of current picture 510, where the reference blocks are included in reference pictures 500, 520. For example, boundary block (BBLK) 512 is predicted using reference blocks (REF BBLK) 502 and 522, identified by respective motion vectors of BBLK 512. Sample values of overlapped motion compensation padding block (OMCP BLK) 514, which is a corner neighbor to BBLK 512, may be determined from corresponding MCP BLK 504 and MCP BLK 524, which neighbor REF BBLK 502 and REF BBLK 522 in the same corner direction, respectively.

When the dimension of OMCP BLK 514 W×H is determined, an alternative way to derive MCP BLK 504 and MCP BLK 524 is to use bi-directional prediction with out of the picture boundary motion vectors. When deriving pixel values from MCP BLK 504 and MCP BLK 524, the dimensions of both MCP BLK 504 and MCP BLK 524 is set to be equal to W×H. The OOB condition in JVET-Y0125 may be applied to determine whether any pixel in MCP BLK 504 or MCP BLK 524 is out of the picture boundary. For a pixel that fulfils the OOB condition, only the non-OOB pixel is used to derive the pixel in OMCP BLK 514, e.g., in the shaded portion of padding area 516 in FIG. 20. Otherwise, video encoder 200 and video decoder 300 may calculate the pixel value in OMCP BLK 514 using a weighted combination of values of pixels from MCP BLK 504 and MCP BLK 524, as discussed above.

In some examples, video encoder 200 and video decoder 300 may use MC padding pixels for bi-directional prediction with out of the picture boundary motion vectors. In JVET-Y0125, after the OOB condition is determined for each predictor, the padded pixel in the OOB predictor is discarded, and only the pixel in the non-OOB predictor is used to generate the final predictor. By contrast, per the techniques of this disclosure, when the padded pixel is derived by MC padding, the padded pixel may be is used in the MC process to derive the OOB predictor, and the OOB predictor may be combined with the non-OOB predictor to derive the final predictor. In one example, the combination of OOB predictor and non-OOB predictor is with a predetermined weight factor (0<oobWeightFactor<1), the equation in JVET-Y0125 is then modified as follows:

If $P_{i,j}^{L0}$ is OOB and $P_{i,j}^{L1}$ is non-OOB
$\quad P_{i,j}^{final} = $ oobWeightFactor $ * P_{i,j}^{L0} + (1 - $ oobWeightFactor$) * P_{i,j}^{L1}$
else if $P_{i,j}^{L0}$ is non-OOB and $P_{i,j}^{L1}$ is OOB
$\quad P_{i,j}^{final} = (1 - $ oobWeightFactor$) * P_{i,j}^{L0} + $ oobWeightFactor $ * P_{i,j}^{L1}$
else
$\quad P_{i,j}^{final} = (P_{i,j}^{L0} + P_{i,j}^{L1} + 1) >> 1$ In another example, the value of oobWeightFactor decreases when the distance between the position of OOB predictor and the picture boundary increases.

In some examples, video encoder 200 and video decoder 300 may be configured to use intra-block copy (IBC) block vectors when predicting the padding values. IBC mode is a special coding mode which derives a prediction block by using the block vector (BV) as displacement on the already reconstructed area of the current picture. The BV is similar to a motion vector, compared to the inter prediction mode. In VVC, the BV is in 1-pel precision or 4-pel precision and the IBC prediction is always uni-directional prediction.

In some examples, when a boundary block is coded as IBC block, the BV is used to determine the MC padding block dimension. IBC is generally uni-directional prediction, and thus, the dimension of OMCP BLK 514 is same dimension as MCP BLK 504, and the dimension of MCP BLK 504 is determined by the padding direction and BV of the boundary block per the techniques discussed above. The padding block may be derived by using the BV in the reconstructed area of the current picture.

In some examples, the MC padding process is applied when a boundary block is reconstructed. The MC padded pixel is used in IBC prediction when a BV points to a reference block that is partially or fully outside of the picture boundary.

Referring again to FIG. 1, following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an rn-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 21:
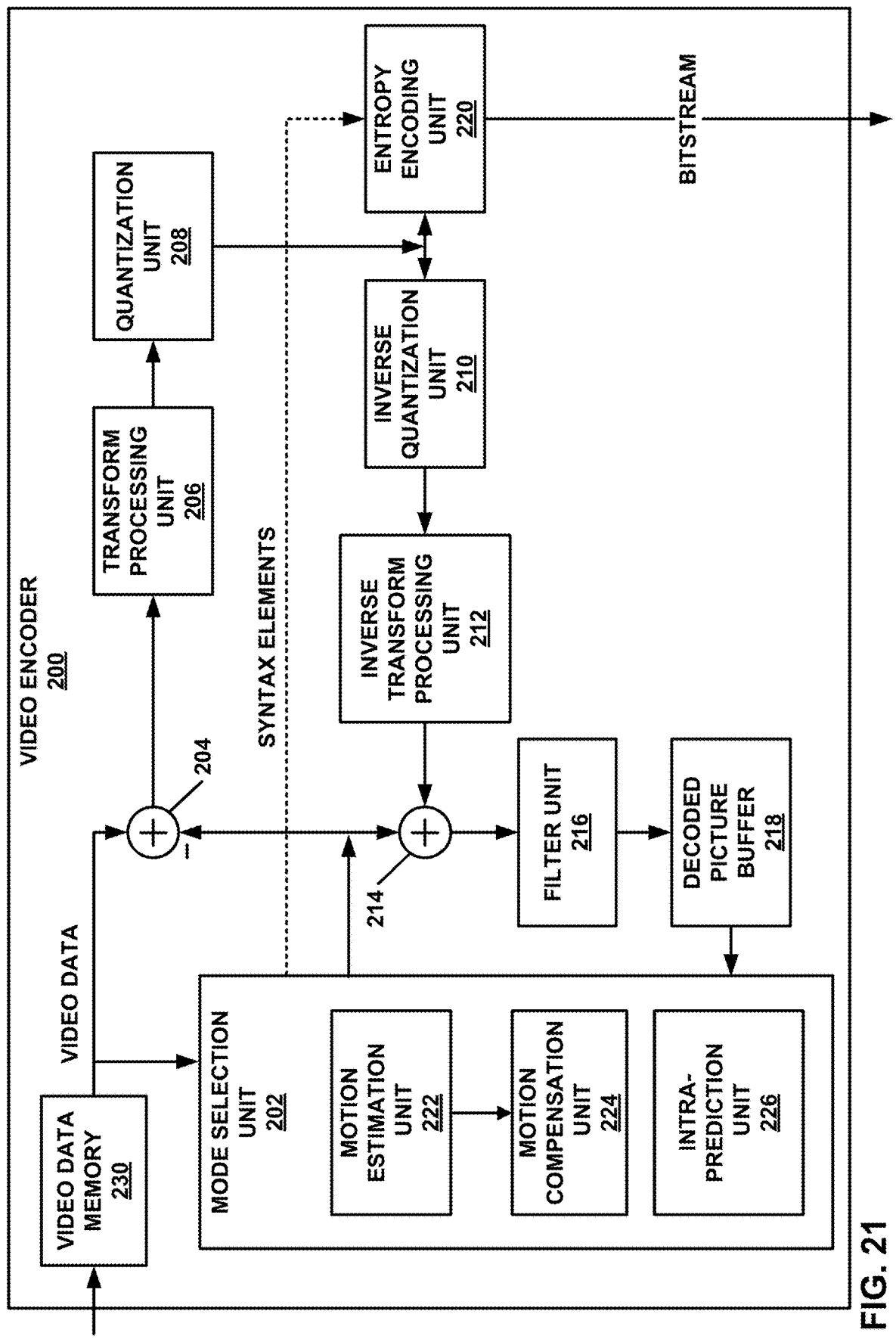
FIG. 21 is a block diagram illustrating an example video encoder that may perform the techniques of this disclosure.

FIG. 21 is a block diagram illustrating an example video encoder 200 that may perform the techniques of this disclosure. FIG. 21 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 21, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 21 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

Motion compensation unit 224 may also perform any of the various techniques of this disclosure, alone or in any combination, related to bi-directional motion compensated prediction of padding pixels. For example, motion compensation unit 224 may calculate values of padding regions of a decoded picture using values of neighbor blocks to reference blocks that neighbor the reference blocks in directions corresponding to a direction from a block within the decoded picture. That is, motion compensation unit 224 may determine that a boundary block of the decoded picture is bi-directional inter-predicted using a first motion vector and a second motion vector, and that the boundary block has an edge that touches an edge of the picture.

As discussed above, BBLKs 424, 454, 482, and 512 of FIGS. 17-20 represent examples of boundary blocks that have at least one edge that touches an edge of a decoded picture. Motion compensation unit 224 may determine values for padding areas 426, 456, 486, and 516 around pictures 420, 450, 480, and 510 using bi-directional motion compensated prediction of padding pixels. For padding pixels on an opposite side of an edge of the decoded picture, such as with OMCP BLK 422 and OMCP BLK 452, motion compensation unit 224 may determine values using samples of one or both of blocks neighboring reference blocks identified using the motion vectors.

For example, in FIG. 17, OMCP BLK 422 is above BBLK 424. That is, the portion of padding area 426 for which padding values are to be determined (corresponding to OMCP BLK 422) is on the opposite side of the top edge of picture 420 as BBLK 424, which shares the top edge of picture 420. Therefore, motion compensation unit 224 may determine values for OMCP BLK 422 using blocks above REF BBLKs 414 and 434, i.e., MCP BLKs 412 and 432, respectively. As another example, in FIG. 18, OMCP BLK 452 is to the left of BBLK 454. That is, the portion of padding area 456 for which padding values are to be determined (corresponding to OMCP BLK 452) is on the opposite side of the left edge of picture 450 as BBLK 454, which shares the left edge of picture 450. Therefore, motion compensation unit 224 may determine values for OMCP BLK 422 using blocks to the left of REF BBLKs 444 and 464, i.e., MCP BLKs 442 and 462, respectively.

As another example, in FIG. 19, BBLK 482 is at a bottom-right corner of picture 480. Thus, motion compensation unit 224 may determine padding values for OMCP BLK 484 using motion information of BBLK 482. As shown in FIG. 19, because BBLK 482 is at the bottom-right corner of picture 480, BBLK 482 touches both the right edge and the bottom edge of picture 480. OMCP BLK 484 is thus on opposite sides of both the right edge and the bottom edge of picture 480. Similarly, in FIG. 20, OMCP BLK 514 is on opposite edges of picture 510 as BBLK 512, i.e., the bottom edge and the right edge of picture 510, because BBLK 512 is at the bottom-right corner of picture 510.

Motion compensation unit 224 may form a first intermediate padding block using a first motion vector of the block of the decoded picture. In particular, motion compensation unit 224 may determine a first reference block of the decoded picture using the first motion vector, then retrieve values from a block that is in the same direction relative to the first reference block as the padding block for which the values are being retrieved relative to the block of the decoded picture. For example, in FIG. 17, MCP BLK 412 is above REF BBLK 414, and values of samples of MCP BLK 412 are used to form padding values in OMCP BLK 422. As another example, in FIG. 18, MCP BLK 442 is to the left of REF BBLK 444, and values of MCP BLK 442 are used to form padding values in OMCP BLK 452. As another example, in FIG. 19, MCP BLK 474 is below and to the right of REF BBLK 472, and values of MCP BLK 474 are used to form padding values in OMCP BLK 484. As another example, in FIG. 20, MCP BLK 504 is below and to the right of REF BBLK 502, and MCP BLK 504 is used to form padding values of OMCP BLK 514.

Motion compensation unit 224 may also form a second intermediate padding block using a second motion vector of the block of the decoded picture. In particular, motion compensation unit 224 may determine a second reference block of the decoded picture using the second motion vector, then retrieve values from a block that is in the same direction relative to the second reference block as the padding block for which the values are being retrieved relative to the block of the decoded picture. For example, in FIG. 17, MCP BLK 432 is above REF BBLK 434, and values of samples of MCP BLK 432 are used to form padding values in OMCP BLK 422. As another example, in FIG. 18, MCP BBLK 462 is to the left of REF BBLK 464, and values of MCP BLK 462 are used to form padding values in OMCP BLK 452. As another example, in FIG. 19, MCP BLK 494 is below and to the right of REF BBLK 492, and values of MCP BLK 494 are used to form padding values in OMCP BLK 484. As another example, in FIG. 20, MCP BLK 524 is below and to the right of REF BBLK 522, and MCP BLK 524 is used to form padding values of OMCP BLK 514.

Motion compensation unit 224 may then form a padding block using the first intermediate padding block and the second intermediate padding block. For example, if the first and second intermediate padding blocks are the same size, motion compensation unit 224 may perform a weighted combination of co-located values of the intermediate padding blocks to form the final padding values. However, if the first and second intermediate padding blocks are different sizes, e.g., in width and/or height, to the extent the intermediate padding blocks overlap, the overlapped region may be combined using a weighted combination. Then for non-overlapped portions, the padding values may be equal to the corresponding one of the intermediate padding blocks for which samples are available. The non-overlapped portions are shown using grey shading in FIGS. 17-20.

Motion compensation unit 224 may then assign the padding values to the padding region around the decoded picture neighboring the boundary block on an opposite side of the edge of the picture, as discussed above. Motion compensation unit 224 may then store the decoded picture, along with the padding values, to DPB 218. In this manner, the values of the padding region may be used for reference when coding a subsequent picture. For example, if motion information refers to a block that overlaps the edge of the picture and extends into the padding region, the padding values may be retrieved and used to form a prediction block for the block.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction BBLK. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 22:
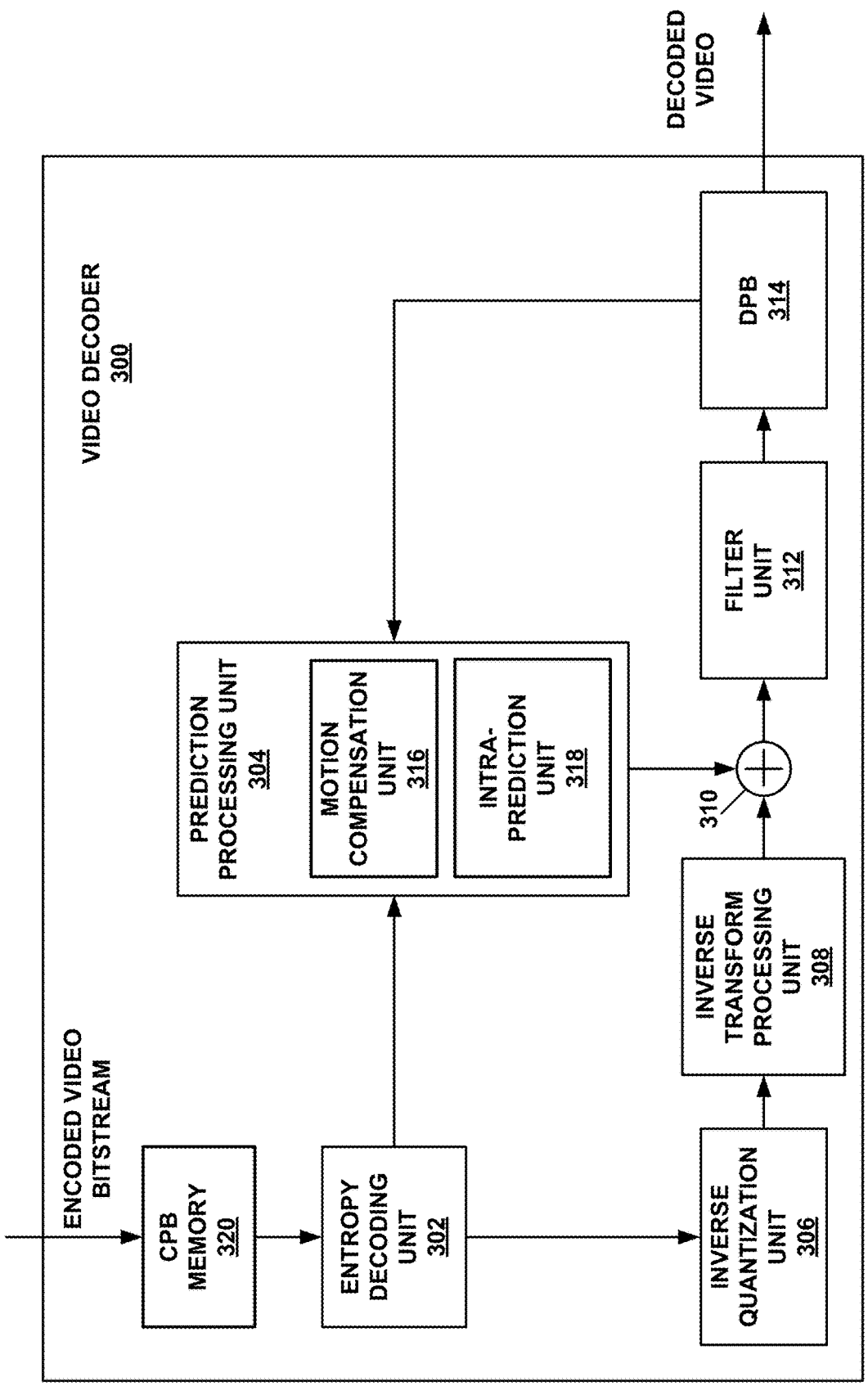
FIG. 22 is a block diagram illustrating an example video decoder that may perform the techniques of this disclosure.

FIG. 22 is a block diagram illustrating an example video decoder 300 that may perform the techniques of this disclosure. FIG. 22 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 22, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 22 are illustrated to assist with understanding the operations performed by video decoder 300. The units may be implemented as fixed-function circuits, programmable circuits, or a combination thereof. Similar to FIG. 21, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 21).

Motion compensation unit 316 may also perform any of the various techniques of this disclosure, alone or in any combination, related to bi-directional motion compensated prediction of padding pixels. Motion compensation unit 316 may also perform any of the various techniques of this disclosure, alone or in any combination, related to bi-directional motion compensated prediction of padding pixels. For example, motion compensation unit 316 may calculate values of padding regions of a decoded picture using values of neighbor blocks to reference blocks that neighbor the reference blocks in directions corresponding to a direction from a block within the decoded picture. That is, motion compensation unit 316 may determine that a boundary block of the decoded picture is bi-directional inter-predicted using a first motion vector and a second motion vector, and that the boundary block has an edge that touches an edge of the picture.

As discussed above, BBLKs 424, 454, 482, and 512 of FIGS. 17-20 represent examples of boundary blocks that have at least one edge that touches an edge of a decoded picture. Motion compensation unit 316 may determine values for padding areas 426, 456, 486, and 516 around pictures 420, 450, 480, and 510 using bi-directional motion compensated prediction of padding pixels. For padding pixels on an opposite side of an edge of the decoded picture, such as with OMCP BLK 422 and OMCP BLK 452, motion compensation unit 316 may determine values using samples of one or both of blocks neighboring reference blocks identified using the motion vectors.

For example, in FIG. 17, OMCP BLK 422 is above BBLK 424. That is, the portion of padding area 426 for which padding values are to be determined (corresponding to OMCP BLK 422) is on the opposite side of the top edge of picture 420 as BBLK 424, which shares the top edge of picture 420. Therefore, motion compensation unit 316 may determine values for OMCP BLK 422 using blocks above REF BBLKs 414 and 434, i.e., MCP BLKs 412 and 432, respectively. As another example, in FIG. 18, OMCP BLK 452 is to the left of BBLK 454. That is, the portion of padding area 456 for which padding values are to be determined (corresponding to OMCP BLK 452) is on the opposite side of the left edge of picture 450 as BBLK 454, which shares the left edge of picture 450. Therefore, motion compensation unit 316 may determine values for OMCP BLK 422 using blocks to the left of REF BBLKs 444 and 464, i.e., MCP BLKs 442 and 462, respectively.

As another example, in FIG. 19, BBLK 482 is at a bottom-right corner of picture 480. Thus, motion compensation unit 316 may determine padding values for OMCP BLK 484 using motion information of BBLK 482. As shown in FIG. 19, because BBLK 482 is at the bottom-right corner of picture 480, BBLK 482 touches both the right edge and the bottom edge of picture 480. OMCP BLK 484 is thus on opposite sides of both the right edge and the bottom edge of picture 480. Similarly, in FIG. 20, OMCP BLK 514 is on opposite edges of picture 510 as BBLK 512, i.e., the bottom edge and the right edge of picture 510, because BBLK 512 is at the bottom-right corner of picture 510.

Motion compensation unit 316 may form a first intermediate padding block using a first motion vector of the block of the decoded picture. In particular, motion compensation unit 316 may determine a first reference block of the decoded picture using the first motion vector, then retrieve values from a block that is in the same direction relative to the first reference block as the padding block for which the values are being retrieved relative to the block of the decoded picture. For example, in FIG. 17, MCP BLK 412 is above REF BBLK 414, and values of samples of MCP BLK 412 are used to form padding values in OMCP BLK 422. As another example, in FIG. 18, MCP BLK 442 is to the left of REF BBLK 444, and values of MCP BLK 442 are used to form padding values in OMCP BLK 452. As another example, in FIG. 19, MCP BLK 474 is below and to the right of REF BBLK 472, and values of MCP BLK 474 are used to form padding values in OMCP BLK 484. As another example, in FIG. 20, MCP BLK 504 is below and to the right of REF BBLK 502, and MCP BLK 504 is used to form padding values of OMCP BLK 514.

Motion compensation unit 316 may also form a second intermediate padding block using a second motion vector of the block of the decoded picture. In particular, motion compensation unit 316 may determine a second reference block of the decoded picture using the second motion vector, then retrieve values from a block that is in the same direction relative to the second reference block as the padding block for which the values are being retrieved relative to the block of the decoded picture. For example, in FIG. 17, MCP BLK 432 is above REF BBLK 434, and values of samples of MCP BLK 432 are used to form padding values in OMCP BLK 422. As another example, in FIG. 18, MCP BBLK 462 is to the left of REF BBLK 464, and values of MCP BLK 462 are used to form padding values in OMCP BLK 452. As another example, in FIG. 19, MCP BLK 494 is below and to the right of REF BBLK 492, and values of MCP BLK 494 are used to form padding values in OMCP BLK 484. As another example, in FIG. 20, MCP BLK 524 is below and to the right of REF BBLK 522, and MCP BLK 524 is used to form padding values of OMCP BLK 514.

Motion compensation unit 316 may then form a padding block using the first intermediate padding block and the second intermediate padding block. For example, if the first and second intermediate padding blocks are the same size, motion compensation unit 316 may perform a weighted combination of co-located values of the intermediate padding blocks to form the final padding values. However, if the first and second intermediate padding blocks are different sizes, e.g., in width and/or height, to the extent the intermediate padding blocks overlap, the overlapped region may be combined using a weighted combination. Then for non-overlapped portions, the padding values may be equal to the corresponding one of the intermediate padding blocks for which samples are available. The non-overlapped portions are shown using grey shading in FIGS. 17-20.

Motion compensation unit 316 may then assign the padding values to the padding region around the decoded picture neighboring the boundary block on an opposite side of the edge of the picture, as discussed above. Motion compensation unit 316 may then store the decoded picture, along with the padding values, to DPB 314. In this manner, the values of the padding region may be used for reference when coding a subsequent picture. For example, if motion information refers to a block that overlaps the edge of the picture and extends into the padding region, the padding values may be retrieved and used to form a prediction block for the block.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 21). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 23:
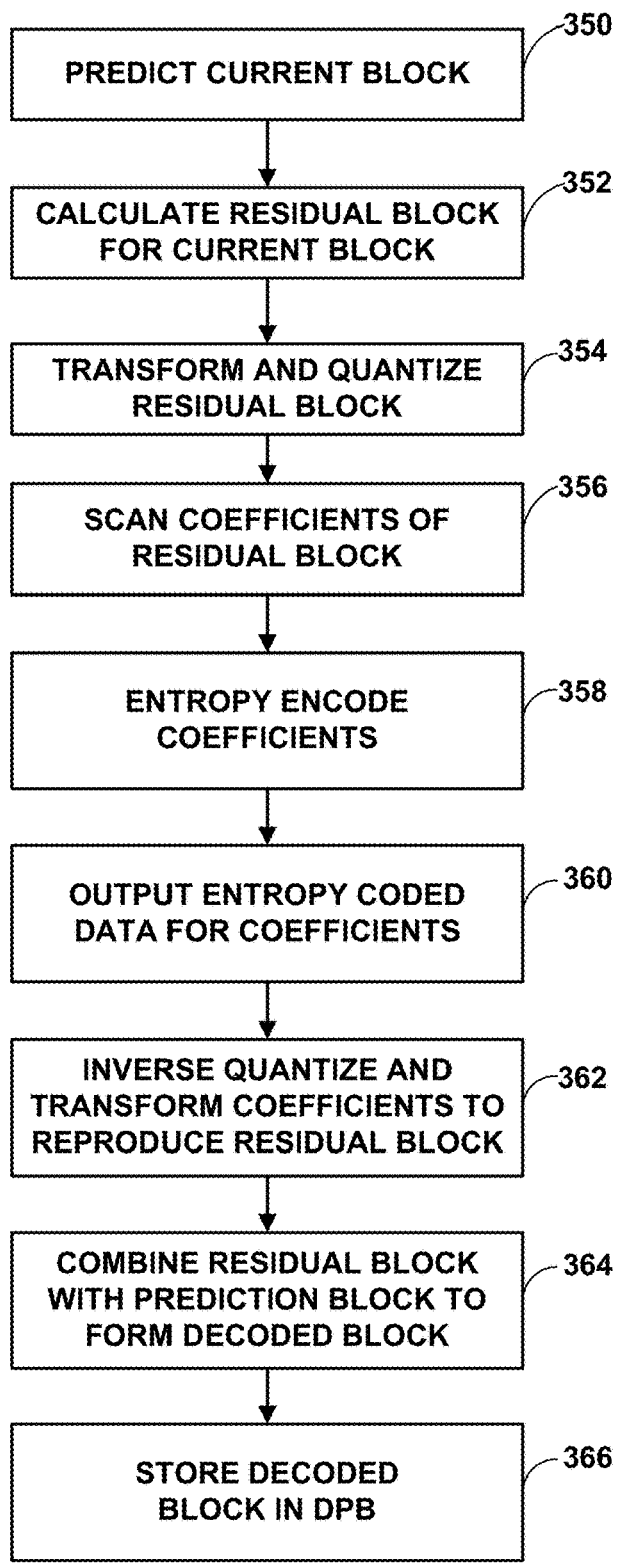
FIG. 23 is a flowchart illustrating an example method for encoding a current block in accordance with the techniques of this disclosure.

FIG. 23 is a flowchart illustrating an example method for encoding a current block in accordance with the techniques of this disclosure. The current block may comprise a current CU. Although described with respect to video encoder 200 (FIGS. 1 and 21), it should be understood that other devices may be configured to perform a method similar to that of FIG. 23.

In this example, video encoder 200 initially predicts the current block (350). For example, video encoder 200 may form a prediction block for the current block. The current block may be inter-predicted using one or more motion vectors that refer to reference blocks that are partially or fully outside of a reference picture including the reference blocks. According to the techniques of this disclosure, video encoder 200 may determine whether the reference block overlaps a bi-directionally predicted block of the reference picture. If so, video encoder 200 may use the techniques of this disclosure to calculate values for padding pixels of the reference block that are outside the boundaries of the reference picture, and use these padding pixels to form the prediction block for the current block.

Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 24:
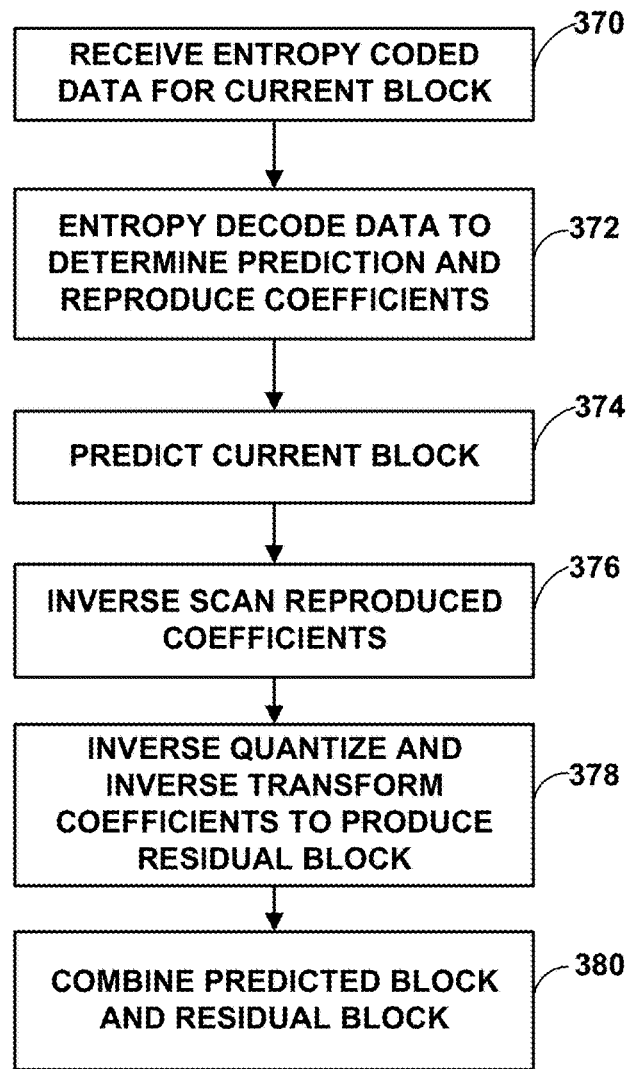
FIG. 24 is a flowchart illustrating an example method for decoding a current block in accordance with the techniques of this disclosure.

FIG. 24 is a flowchart illustrating an example method for decoding a current block of video data in accordance with the techniques of this disclosure. The current block may comprise a current CU. Although described with respect to video decoder 300 (FIGS. 1 and 22), it should be understood that other devices may be configured to perform a method similar to that of FIG. 24.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. The current block may be inter-predicted using one or more motion vectors that refer to reference blocks that are partially or fully outside of a reference picture including the reference blocks. According to the techniques of this disclosure, video decoder 300 may determine whether the reference block overlaps a bi-directionally predicted block of the reference picture. If so, video decoder 300 may use the techniques of this disclosure to calculate values for padding pixels of the reference block that are outside the boundaries of the reference picture, and use these padding pixels to form the prediction block for the current block.

Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 25:
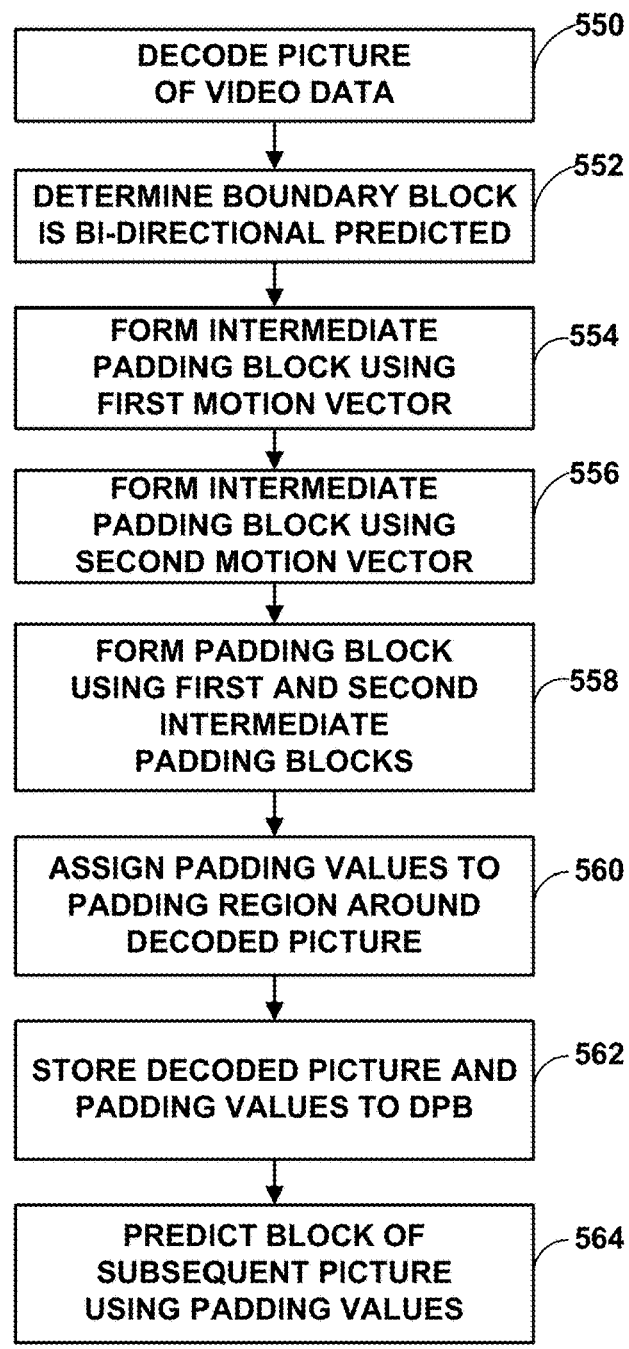
FIG. 25 is a flowchart illustrating an example method of decoding video data and forming padding data around a decoded picture according to the techniques of this disclosure.

FIG. 25 is a flowchart illustrating an example method of decoding video data and forming padding data around a decoded picture according to the techniques of this disclosure. The method of FIG. 25 is explained with respect to video decoder 300, but video encoder 200 may also perform the techniques of FIG. 25 during a decoding operation after encoding. In this manner, the padding values formed by video encoder 200 and video decoder 300 may be the same, such that the padding values can be used for prediction of subsequent video data.

Initially, video decoder 300 may decode a picture of video data (550), e.g., as explained above with respect to FIGS. 1, 22, and 24. Video decoder 300 may then determine to form padding values for a padding area around the decoded picture. Video decoder 300 may refer to each block around the boundary and attempt to form padding values using motion information of the blocks, if possible. Video decoder 300 may determine that one of the boundary blocks is bi-directionally predicted (552), i.e., predicted with a first motion vector and a second motion vector. The first and second motion vectors may refer to different pictures, e.g., in different reference picture lists.

Thus, video decoder 300 may form a first intermediate padding block using the first motion vector (554), e.g., as shown in the examples of FIGS. 17-20. Video decoder 300 may also form a second intermediate padding block using the second motion vector (556), e.g., as also shown in the examples of FIGS. 17-20. Video decoder 300 may then form a padding block using the first and second intermediate padding blocks (558). In particular, to the extent the first and second intermediate padding blocks overlap, the padding block may include values corresponding to weighted combinations of values from the first and second intermediate padding blocks. To the extent the first and second intermediate padding blocks do not overlap, the padding area may include values corresponding to the one of the intermediate padding blocks that is available.

Video decoder 300 may then assign the padding values from the padding block to the padding region (or area) around the decoded picture (560). Then, video decoder 300 may store the decoded picture and the padding values to DPB 314 (562). Thus, video decoder 300 may predict a block of a subsequent picture using the padding values (564) retrieved from DPB 314.

In this manner, the method of FIG. 25 represents an example of a method of decoding video data including determining that a boundary block of a picture of video data is bi-directional inter-predicted using a first motion vector and a second motion vector, the boundary block having an edge that touches an edge of the picture; decoding the picture, including decoding the boundary block; forming a first intermediate padding block using the first motion vector; forming a second intermediate padding block using the second motion vector; forming a padding block using the first intermediate padding block and the second intermediate padding block; and assigning padding values of the padding block to a padding region of the picture neighboring the boundary block on an opposite side of the edge of the picture.

Various examples of the techniques of this disclosure are summarized in the following clauses.

Clause 1: A method of decoding video data, the method comprising: determining that a boundary block of a picture of video data is bi-directional inter-predicted using a first motion vector and a second motion vector, the boundary block having an edge that touches an edge of the picture; decoding the picture, including decoding the boundary block; forming a first intermediate padding block using the first motion vector; forming a second intermediate padding block using the second motion vector; forming a padding block using the first intermediate padding block and the second intermediate padding block; and assigning padding values of the padding block to a padding region of the picture neighboring the boundary block on an opposite side of the edge of the picture.

Clause 2: The method of clause 1, wherein the first intermediate padding block and the second intermediate padding block have a common size.

Clause 3: The method of clause 1, wherein the first intermediate padding block has a first size, the second intermediate padding block has a second size smaller than the first size, and the padding block has the first size, and wherein forming the padding block comprises: calculating padding values for a first region of the padding block corresponding to an overlap region between the first intermediate padding block and the second intermediate padding block from corresponding values of the first intermediate padding block and the second intermediate padding block; and determining padding values for a second region of the padding block outside of the overlap region from the first intermediate padding block.

Clause 4: The method of any of clauses 1-3, wherein the edge of the picture comprises one of a top edge of the picture, a left edge of the picture, a right edge of the picture, or a bottom edge of the picture.

Clause 5: The method of clause 4, wherein: when the edge of the picture comprises the top edge of the picture, the padding region is above the top edge of the picture, when the edge of the picture comprises the left edge of the picture, the padding region is to the left of the left edge of the picture, when the edge of the picture comprises the right edge of the picture, the padding region is to the right of the right edge of the picture, and when the edge of the picture comprises the bottom edge of the picture, the padding region is below the bottom edge of the picture.

Clause 6: The method of clause 4, wherein the edge of the picture comprises a first edge of the picture, and wherein the boundary block has a second edge that touches a second edge of the picture such that the boundary block is at a corner of the picture, wherein: when the first edge of the picture is the left edge of the picture and the second edge of the picture is the top edge of the picture, the padding region is above and to the left of the picture, when the first edge of the picture is the right edge of the picture and the second edge of the picture is the top edge of the picture, the padding region is above and to the right of the picture, when the first edge of the picture is the left edge of the picture and the second edge of the picture is the bottom edge of the picture, the padding region is below and to the left of the picture, and when the first edge of the picture is the right edge of the picture and the second edge of the picture is the bottom edge of the picture, the padding region is below and to the right of the picture.

Clause 7: The method of any of clauses 1-6, further comprising: determining a first size of the first intermediate padding block as being less than or equal to a distance between an edge of the first intermediate padding block and an edge of a first reference picture including the first intermediate padding block; and determining a second size of the second intermediate padding block as being less than or equal to a distance between an edge of the second intermediate padding block and an edge of a second reference picture including the second intermediate padding block.

Clause 8: The method of any of clauses 1-7, wherein assigning the padding values comprises: determining a first weight value and a second weight value; applying the first weight value to a first padding value at a position of the first intermediate padding block to form a first weighted padding value; applying the second weight value to a second padding value at a position of the second intermediate padding block co-located with the position of the first padding value of the first intermediate padding block to form a second weighted padding value; and calculating a final padding value at a position of the padding block co-located with the position of the first padding value and the position of the second padding value using the first weighted padding value and the second weighted padding value.

Clause 9: The method of clause 8, wherein the first weight value comprises 0.5 and the second weight value comprises 0.5.

Clause 10: The method of clause 8, wherein determining the first weight value comprises determining the first weight value according to bi-prediction with CU-level weight (BCW).

Clause 11: The method of any of clauses 8-10, further comprising adding offset values to the first padding value and the second padding value prior to applying the first weight value and applying the second weight value.

Clause 12: The method of any of clauses 8-11, further comprising adding offset values to the first weighted padding value and the second weighted padding value prior to calculating the final padding value.

Clause 13: The method of any of clauses 8-12, further comprising applying an offset value to the final padding value.

Clause 14: The method of any of clauses 11-13, further comprising calculating the offset values as being a difference between an average value of the boundary block and an average value of a reference block identified by either the first motion vector or the second motion vector.

Clause 15: The method of any of clauses 1-14, further comprising applying decoder-side motion vector refinement (DMVR) to at least one of the first motion vector or the second motion vector when DMVR is enabled for the picture.

Clause 16: The method of any of clauses 1-14, further comprising skipping decoder-side motion vector refinement (DMVR) for both the first motion vector and the second motion vector when DMVR is enabled for the picture.

Clause 17: The method of any of clauses 1-16, further comprising applying bi-directional optical flow (BDOF) to at least one of the first motion vector or the second motion vector when BDOF is enabled for the picture.

Clause 18: The method of any of clauses 1-16, further comprising skipping bi-directional optical flow (BDOF) for the first motion vector and the second motion vector when BDOF is enabled for the picture.

Clause 19: The method of any of clauses 1-18, wherein when a reference block identified by one of the first motion vector or the second motion vector extends beyond an edge of a first reference picture or a second reference picture, forming the padding block comprises: forming a first portion of the padding block using corresponding portions of the first intermediate padding block and the second intermediate padding block; and forming a second portion of the padding block corresponding to the portion of the reference block that extends beyond the edge of the first reference picture or the second reference picture using only the first intermediate padding block or the second intermediate padding block.

Clause 20: The method of any of clauses 1-19, wherein the picture comprises a reference picture, the method further comprising: coding motion information for a current block of a current picture, the motion information including reference picture data identifying the reference picture and motion vector data identifying a reference block including at least a portion of the padding block; and forming a prediction block for the current block using the padding block.

Clause 21: The method of clause 20, wherein the reference block comprises a first reference block, the reference picture comprises a first reference picture, and the motion vector data includes data for a first current motion vector identifying the first reference block and a second current motion vector identifying a second reference block in a second reference picture for the current block, the method further comprising: determining a first weight to be applied to samples in the at least portion of the first reference block; and determining a second weight to be applied to samples of the first reference block that are within picture boundaries of the first reference picture.

Clause 22: The method of any of clauses 1-21, wherein at least one of the first motion vector or the second motion vector comprises a block vector identifying a reference block in the picture including the boundary block.

Clause 23: The method of clause 1, wherein the first intermediate padding block and the second intermediate padding block have a common size.

Clause 24: The method of clause 1, wherein the first intermediate padding block has a first size, the second intermediate padding block has a second size smaller than the first size, and the padding block has the first size, and wherein forming the padding block comprises: calculating padding values for a first region of the padding block corresponding to an overlap region between the first intermediate padding block and the second intermediate padding block from corresponding values of the first intermediate padding block and the second intermediate padding block; and determining padding values for a second region of the padding block outside of the overlap region from the first intermediate padding block.

Clause 25: The method of clause 1, wherein the edge of the picture comprises one of a top edge of the picture, a left edge of the picture, a right edge of the picture, or a bottom edge of the picture.

Clause 26: The method of clause 25, wherein: when the edge of the picture comprises the top edge of the picture, the padding region is above the top edge of the picture, when the edge of the picture comprises the left edge of the picture, the padding region is to the left of the left edge of the picture, when the edge of the picture comprises the right edge of the picture, the padding region is to the right of the right edge of the picture, and when the edge of the picture comprises the bottom edge of the picture, the padding region is below the bottom edge of the picture.

Clause 27: The method of clause 25, wherein the edge of the picture comprises a first edge of the picture, and wherein the boundary block has a second edge that touches a second edge of the picture such that the boundary block is at a corner of the picture, wherein: when the first edge of the picture is the left edge of the picture and the second edge of the picture is the top edge of the picture, the padding region is above and to the left of the picture, when the first edge of the picture is the right edge of the picture and the second edge of the picture is the top edge of the picture, the padding region is above and to the right of the picture, when the first edge of the picture is the left edge of the picture and the second edge of the picture is the bottom edge of the picture, the padding region is below and to the left of the picture, and when the first edge of the picture is the right edge of the picture and the second edge of the picture is the bottom edge of the picture, the padding region is below and to the right of the picture.

Clause 28: The method of clause 1, further comprising: determining a first size of the first intermediate padding block as being less than or equal to a distance between an edge of the first intermediate padding block and an edge of a first reference picture including the first intermediate padding block; and determining a second size of the second intermediate padding block as being less than or equal to a distance between an edge of the second intermediate padding block and an edge of a second reference picture including the second intermediate padding block.

Clause 29: The method of clause 1, wherein assigning the padding values comprises: determining a first weight value and a second weight value; applying the first weight value to a first padding value at a position of the first intermediate padding block to form a first weighted padding value; applying the second weight value to a second padding value at a position of the second intermediate padding block co-located with the position of the first padding value of the first intermediate padding block to form a second weighted padding value; and calculating a final padding value at a position of the padding block co-located with the position of the first padding value and the position of the second padding value using the first weighted padding value and the second weighted padding value.

Clause 30: The method of clause 29, wherein the first weight value comprises 0.5 and the second weight value comprises 0.5.

Clause 31: The method of clause 29, wherein determining the first weight value comprises determining the first weight value according to bi-prediction with CU-level weight (BCW).

Clause 32: The method of any of clauses 29, further comprising adding offset values to the first padding value and the second padding value prior to applying the first weight value and applying the second weight value.

Clause 33: The method of clause 29, further comprising adding offset values to the first weighted padding value and the second weighted padding value prior to calculating the final padding value.

Clause 34: The method of clause 29, further comprising applying an offset value to the final padding value.

Clause 35: The method of clause 34, further comprising calculating the offset values as being a difference between an average value of the boundary block and an average value of a reference block identified by either the first motion vector or the second motion vector.

Clause 36: The method of clause 1, further comprising applying decoder-side motion vector refinement (DMVR) to at least one of the first motion vector or the second motion vector when DMVR is enabled for the picture.

Clause 37: The method of clause 1, further comprising skipping decoder-side motion vector refinement (DMVR) for both the first motion vector and the second motion vector when DMVR is enabled for the picture.

Clause 38: The method of clause 1, further comprising applying bi-directional optical flow (BDOF) to at least one of the first motion vector or the second motion vector when BDOF is enabled for the picture.

Clause 39: The method of clause 1, further comprising skipping bi-directional optical flow (BDOF) for the first motion vector and the second motion vector when BDOF is enabled for the picture.

Clause 40: The method of clause 1, wherein when a reference block identified by one of the first motion vector or the second motion vector extends beyond an edge of a first reference picture or a second reference picture, forming the padding block comprises: forming a first portion of the padding block using corresponding portions of the first intermediate padding block and the second intermediate padding block; and forming a second portion of the padding block corresponding to the portion of the reference block that extends beyond the edge of the first reference picture or the second reference picture using only the first intermediate padding block or the second intermediate padding block.

Clause 41: The method of clause 1, wherein the picture comprises a reference picture, the method further comprising: coding motion information for a current block of a current picture, the motion information including reference picture data identifying the reference picture and motion vector data identifying a reference block including at least a portion of the padding block; and forming a prediction block for the current block using the padding block.

Clause 42: The method of clause 41, wherein the reference block comprises a first reference block, the reference picture comprises a first reference picture, and the motion vector data includes data for a first current motion vector identifying the first reference block and a second current motion vector identifying a second reference block in a second reference picture for the current block, the method further comprising: determining a first weight to be applied to samples in the at least portion of the first reference block; and determining a second weight to be applied to samples of the first reference block that are within picture boundaries of the first reference picture.

Clause 43: The method of clause 1, wherein at least one of the first motion vector or the second motion vector comprises a block vector identifying a reference block in the picture including the boundary block.

Clause 44: The method of any of clauses 1-43, further comprising encoding the boundary block prior to decoding the boundary block.

Clause 45: The method of clause 1, further comprising encoding the boundary block prior to decoding the boundary block.

Clause 46: A device for decoding video data, the device comprising one or more means for performing the method of any of clauses 1-45.

Clause 47: The device of clause 46, wherein the one or more means comprise one or more processors implemented in circuitry.

Clause 48: The device of any of clauses 46 and 47, further comprising a display configured to display the decoded video data.

Clause 49: The device of any of clauses 46-48, wherein the device comprises one or more of a camera, a computer, a mobile device, a broadcast receiver device, or a set-top box.

Clause 50: The device of clause 46-49, further comprising a memory configured to store the video data.

Clause 51: A computer-readable storage medium having stored thereon instructions that, when executed, cause a processor of a device for decoding video data to perform the method of any of clauses 1-45.

Clause 52: A device for decoding video data, the device comprising: means for determining that a boundary block of a picture of video data is bi-directional inter-predicted using a first motion vector and a second motion vector, the boundary block having an edge that touches an edge of the picture; means for decoding the picture, including decoding the boundary block; means for forming a first intermediate padding block using the first motion vector; means for forming a second intermediate padding block using the second motion vector; means for forming a padding block using the first intermediate padding block and the second intermediate padding block; and means for assigning padding values of the padding block to a padding region of the picture neighboring the boundary block on an opposite side of the edge of the picture.

Clause 53: A device for decoding video data, the device comprising: a memory configured to store video data; and one or more processors implemented in circuitry and configured to: determine that a boundary block of a picture of the video data is bi-directional inter-predicted using a first motion vector and a second motion vector, the boundary block having an edge that touches an edge of the picture; decode the picture, including decoding the boundary block; form a first intermediate padding block using the first motion vector; form a second intermediate padding block using the second motion vector; form a padding block using the first intermediate padding block and the second intermediate padding block; and assign padding values of the padding block to a padding region of the picture neighboring the boundary block on an opposite side of the edge of the picture.

Clause 54: The device of clause 53, wherein the first intermediate padding block has a first size, the second intermediate padding block has a second size smaller than the first size, and the padding block has the first size, and wherein to form the padding block, the one or more processors are configured to: calculate padding values for a first region of the padding block corresponding to an overlap region between the first intermediate padding block and the second intermediate padding block from corresponding values of the first intermediate padding block and the second intermediate padding block; and determine padding values for a second region of the padding block from the first intermediate padding block, the second region of the padding block being outside of the overlap region.

Clause 55: The device of any of clauses 53 and 54, wherein to assign the padding values, the one or more processors are configured to: determine a first weight value and a second weight value; apply the first weight value to a first padding value at a position of the first intermediate padding block to form a first weighted padding value; apply the second weight value to a second padding value at a position of the second intermediate padding block co-located with the position of the first padding value of the first intermediate padding block to form a second weighted padding value; and calculate a final padding value at a position of the padding block co-located with the position of the first padding value and the position of the second padding value using the first weighted padding value and the second weighted padding value.

Clause 56: The device of any of clauses 53-55, further comprising a display configured to display the decoded video data.

Clause 57: The device of any of clauses 53-56, wherein the device comprises one or more of a camera, a computer, a mobile device, a broadcast receiver device, or a set-top box.

Clause 58: A method of decoding video data, the method comprising: determining that a boundary block of a picture of video data is bi-directional inter-predicted using a first motion vector and a second motion vector, the boundary block having an edge that touches an edge of the picture; decoding the picture, including decoding the boundary block; forming a first intermediate padding block using the first motion vector; forming a second intermediate padding block using the second motion vector; forming a padding block using the first intermediate padding block and the second intermediate padding block; and assigning padding values of the padding block to a padding region of the picture neighboring the boundary block on an opposite side of the edge of the picture.

Clause 59: The method of clause 58, wherein the first intermediate padding block and the second intermediate padding block have a common size.

Clause 60: The method of clause 58, wherein the first intermediate padding block has a first size, the second intermediate padding block has a second size smaller than the first size, and the padding block has the first size, and wherein forming the padding block comprises: calculating padding values for a first region of the padding block corresponding to an overlap region between the first intermediate padding block and the second intermediate padding block from corresponding values of the first intermediate padding block and the second intermediate padding block; and determining padding values for a second region of the padding block outside of the overlap region from the first intermediate padding block.

Clause 61: The method of clause 58, wherein the edge of the picture comprises one of a top edge of the picture, a left edge of the picture, a right edge of the picture, or a bottom edge of the picture.

Clause 62: The method of clause 61, wherein: when the edge of the picture comprises the top edge of the picture, the padding region is above the top edge of the picture, when the edge of the picture comprises the left edge of the picture, the padding region is to the left of the left edge of the picture, when the edge of the picture comprises the right edge of the picture, the padding region is to the right of the right edge of the picture, and when the edge of the picture comprises the bottom edge of the picture, the padding region is below the bottom edge of the picture.

Clause 63: The method of clause 61, wherein the edge of the picture comprises a first edge of the picture, and wherein the boundary block has a second edge that touches a second edge of the picture such that the boundary block is at a corner of the picture, wherein: when the first edge of the picture is the left edge of the picture and the second edge of the picture is the top edge of the picture, the padding region is above and to the left of the picture, when the first edge of the picture is the right edge of the picture and the second edge of the picture is the top edge of the picture, the padding region is above and to the right of the picture, when the first edge of the picture is the left edge of the picture and the second edge of the picture is the bottom edge of the picture, the padding region is below and to the left of the picture, and when the first edge of the picture is the right edge of the picture and the second edge of the picture is the bottom edge of the picture, the padding region is below and to the right of the picture.

Clause 64: The method of clause 58, further comprising: determining a first size of the first intermediate padding block as being less than or equal to a distance between an edge of the first intermediate padding block and an edge of a first reference picture including the first intermediate padding block; and determining a second size of the second intermediate padding block as being less than or equal to a distance between an edge of the second intermediate padding block and an edge of a second reference picture including the second intermediate padding block.

Clause 65: The method of clause 58, wherein assigning the padding values comprises: determining a first weight value and a second weight value; applying the first weight value to a first padding value at a position of the first intermediate padding block to form a first weighted padding value; applying the second weight value to a second padding value at a position of the second intermediate padding block co-located with the position of the first padding value of the first intermediate padding block to form a second weighted padding value; and calculating a final padding value at a position of the padding block co-located with the position of the first padding value and the position of the second padding value using the first weighted padding value and the second weighted padding value.

Clause 66: The method of clause 65, wherein the first weight value comprises 0.5 and the second weight value comprises 0.5.

Clause 67: The method of clause 65, wherein determining the first weight value comprises determining the first weight value according to bi-prediction with CU-level weight (BCW).

Clause 68: The method of clause 65, further comprising adding offset values to the first padding value and the second padding value prior to applying the first weight value and applying the second weight value.

Clause 69: The method of clause 68, further comprising calculating each of the offset values as being a difference between an average value of the boundary block and an average value of a reference block identified by either the first motion vector or the second motion vector.

Clause 70: The method of clause 65, further comprising adding offset values to the first weighted padding value and the second weighted padding value prior to calculating the final padding value.

Clause 71: The method of clause 65, further comprising applying an offset value to the final padding value.

Clause 72: The method of clause 58, further comprising applying decoder-side motion vector refinement (DMVR) to at least one of the first motion vector or the second motion vector when DMVR is enabled for the picture.

Clause 73: The method of clause 58, further comprising skipping decoder-side motion vector refinement (DMVR) for both the first motion vector and the second motion vector when DMVR is enabled for the picture.

Clause 74: The method of clause 58, further comprising applying bi-directional optical flow (BDOF) to at least one of the first motion vector or the second motion vector when BDOF is enabled for the picture.

Clause 75: The method of clause 58, further comprising skipping bi-directional optical flow (BDOF) for the first motion vector and the second motion vector when BDOF is enabled for the picture.

Clause 76: The method of clause 58, wherein when a reference block identified by one of the first motion vector or the second motion vector extends beyond an edge of a first reference picture or a second reference picture, forming the padding block comprises: forming a first portion of the padding block using corresponding portions of the first intermediate padding block and the second intermediate padding block; and forming a second portion of the padding block corresponding to the portion of the reference block that extends beyond the edge of the first reference picture or the second reference picture using only the first intermediate padding block or the second intermediate padding block.

Clause 77: The method of clause 58, wherein the picture comprises a reference picture, the method further comprising: coding motion information for a current block of a current picture, the motion information including reference picture data identifying the reference picture and motion vector data identifying a reference block including at least a portion of the padding block; and forming a prediction block for the current block using the padding block.

Clause 78: The method of clause 77, wherein the reference block comprises a first reference block, the reference picture comprises a first reference picture, and the motion vector data includes data for a first current motion vector identifying the first reference block and a second current motion vector identifying a second reference block in a second reference picture for the current block, the method further comprising: determining a first weight to be applied to samples in the at least portion of the first reference block; and determining a second weight to be applied to samples of the first reference block that are within picture boundaries of the first reference picture.

Clause 79: The method of clause 58, wherein at least one of the first motion vector or the second motion vector comprises a block vector identifying a reference block in the picture including the boundary block.

Clause 80: The method of clause 58, further comprising encoding the boundary block prior to decoding the boundary block.

Clause 81: A device for decoding video data, the device comprising: a memory configured to store video data; and one or more processors implemented in circuitry and configured to: determine that a boundary block of a picture of the video data is bi-directional inter-predicted using a first motion vector and a second motion vector, the boundary block having an edge that touches an edge of the picture; decode the picture, including decoding the boundary block; form a first intermediate padding block using the first motion vector; form a second intermediate padding block using the second motion vector; form a padding block using the first intermediate padding block and the second intermediate padding block; and assign padding values of the padding block to a padding region of the picture neighboring the boundary block on an opposite side of the edge of the picture.

Clause 82: The device of clause 81, wherein the first intermediate padding block has a first size, the second intermediate padding block has a second size smaller than the first size, and the padding block has the first size, and wherein to form the padding block, the one or more processors are configured to: calculate padding values for a first region of the padding block corresponding to an overlap region between the first intermediate padding block and the second intermediate padding block from corresponding values of the first intermediate padding block and the second intermediate padding block; and determine padding values for a second region of the padding block from the first intermediate padding block, the second region of the padding block being outside of the overlap region.

Clause 83: The device of clause 81, wherein to assign the padding values, the one or more processors are configured to: determine a first weight value and a second weight value; apply the first weight value to a first padding value at a position of the first intermediate padding block to form a first weighted padding value; apply the second weight value to a second padding value at a position of the second intermediate padding block co-located with the position of the first padding value of the first intermediate padding block to form a second weighted padding value; and calculate a final padding value at a position of the padding block co-located with the position of the first padding value and the position of the second padding value using the first weighted padding value and the second weighted padding value.

Clause 84: The device of clause 81, further comprising a display configured to display the decoded video data.

Clause 85: The device of clause 81, wherein the device comprises one or more of a camera, a computer, a mobile device, a broadcast receiver device, or a set-top box.

Clause 86: A computer-readable storage medium having stored thereon instructions that, when executed, cause a processor to: determine that a boundary block of a picture of video data is bi-directional inter-predicted using a first motion vector and a second motion vector, the boundary block having an edge that touches an edge of the picture;

decode the picture, including decoding the boundary block; form a first intermediate padding block using the first motion vector; form a second intermediate padding block using the second motion vector; form a padding block using the first intermediate padding block and the second intermediate padding block; and assign padding values of the padding block to a padding region of the picture neighboring the boundary block on an opposite side of the edge of the picture.

Clause 87: A device for decoding video data, the device comprising: means for determining that a boundary block of a picture of video data is bi-directional inter-predicted using a first motion vector and a second motion vector, the boundary block having an edge that touches an edge of the picture; means for decoding the picture, including decoding the boundary block; means for forming a first intermediate padding block using the first motion vector; means for forming a second intermediate padding block using the second motion vector; means for forming a padding block using the first intermediate padding block and the second intermediate padding block; andmeans for assigning padding values of the padding block to a padding region of the picture neighboring the boundary block on an opposite side of the edge of the picture.

Clause 88: A method of decoding video data, the method comprising: determining that a boundary block of a picture of video data is bi-directional inter-predicted using a first motion vector and a second motion vector, the boundary block having an edge that touches an edge of the picture; decoding the picture, including decoding the boundary block; forming a first intermediate padding block using the first motion vector; forming a second intermediate padding block using the second motion vector; forming a padding block using the first intermediate padding block and the second intermediate padding block; and assigning padding values of the padding block to a padding region of the picture neighboring the boundary block on an opposite side of the edge of the picture.

Clause 89: The method of clause 88, wherein the first intermediate padding block and the second intermediate padding block have a common size.

Clause 90: The method of any of clauses 88 and 89, wherein the first intermediate padding block has a first size, the second intermediate padding block has a second size smaller than the first size, and the padding block has the first size, and wherein forming the padding block comprises: calculating padding values for a first region of the padding block corresponding to an overlap region between the first intermediate padding block and the second intermediate padding block from corresponding values of the first intermediate padding block and the second intermediate padding block; and determining padding values for a second region of the padding block outside of the overlap region from the first intermediate padding block.

Clause 91: The method of any of clauses 88-90, wherein the edge of the picture comprises one of a top edge of the picture, a left edge of the picture, a right edge of the picture, or a bottom edge of the picture.

Clause 92: The method of clause 91, wherein: when the edge of the picture comprises the top edge of the picture, the padding region is above the top edge of the picture, when the edge of the picture comprises the left edge of the picture, the padding region is to the left of the left edge of the picture, when the edge of the picture comprises the right edge of the picture, the padding region is to the right of the right edge of the picture, and when the edge of the picture comprises the bottom edge of the picture, the padding region is below the bottom edge of the picture.

Clause 93: The method of any of clauses 91 and 92, wherein the edge of the picture comprises a first edge of the picture, and wherein the boundary block has a second edge that touches a second edge of the picture such that the boundary block is at a corner of the picture, wherein: when the first edge of the picture is the left edge of the picture and the second edge of the picture is the top edge of the picture, the padding region is above and to the left of the picture, when the first edge of the picture is the right edge of the picture and the second edge of the picture is the top edge of the picture, the padding region is above and to the right of the picture, when the first edge of the picture is the left edge of the picture and the second edge of the picture is the bottom edge of the picture, the padding region is below and to the left of the picture, and when the first edge of the picture is the right edge of the picture and the second edge of the picture is the bottom edge of the picture, the padding region is below and to the right of the picture.

Clause 94: The method of any of clauses 88-93, further comprising: determining a first size of the first intermediate padding block as being less than or equal to a distance between an edge of the first intermediate padding block and an edge of a first reference picture including the first intermediate padding block; and determining a second size of the second intermediate padding block as being less than or equal to a distance between an edge of the second intermediate padding block and an edge of a second reference picture including the second intermediate padding block.

Clause 95: The method of any of clauses 88-94, wherein assigning the padding values comprises: determining a first weight value and a second weight value; applying the first weight value to a first padding value at a position of the first intermediate padding block to form a first weighted padding value; applying the second weight value to a second padding value at a position of the second intermediate padding block co-located with the position of the first padding value of the first intermediate padding block to form a second weighted padding value; and calculating a final padding value at a position of the padding block co-located with the position of the first padding value and the position of the second padding value using the first weighted padding value and the second weighted padding value.

Clause 96: The method of clause 95, wherein the first weight value comprises 0.5 and the second weight value comprises 0.5.

Clause 97: The method of any of clauses 95 and 96, wherein determining the first weight value comprises determining the first weight value according to bi-prediction with CU-level weight (BCW).

Clause 98: The method of any of clauses 95-97, further comprising adding offset values to the first padding value and the second padding value prior to applying the first weight value and applying the second weight value.

Clause 99: The method of clause 98, further comprising calculating each of the offset values as being a difference between an average value of the boundary block and an average value of a reference block identified by either the first motion vector or the second motion vector.

Clause 100: The method of any of clauses 95-99, further comprising adding offset values to the first weighted padding value and the second weighted padding value prior to calculating the final padding value.

Clause 101: The method of any of clauses 95-100, further comprising applying an offset value to the final padding value.

Clause 102: The method of any of clauses 88-101, further comprising applying decoder-side motion vector refinement (DMVR) to at least one of the first motion vector or the second motion vector when DMVR is enabled for the picture.

Clause 103: The method of any of clauses 88-102, further comprising skipping decoder-side motion vector refinement (DMVR) for both the first motion vector and the second motion vector when DMVR is enabled for the picture.

Clause 104: The method of any of clauses 88-103, further comprising applying bi-directional optical flow (BDOF) to at least one of the first motion vector or the second motion vector when BDOF is enabled for the picture.

Clause 105: The method of any of clauses 88-104, further comprising skipping bi-directional optical flow (BDOF) for the first motion vector and the second motion vector when BDOF is enabled for the picture.

Clause 106: The method of any of clauses 88-105, wherein when a reference block identified by one of the first motion vector or the second motion vector extends beyond an edge of a first reference picture or a second reference picture, forming the padding block comprises: forming a first portion of the padding block using corresponding portions of the first intermediate padding block and the second intermediate padding block; and forming a second portion of the padding block corresponding to the portion of the reference block that extends beyond the edge of the first reference picture or the second reference picture using only the first intermediate padding block or the second intermediate padding block.

Clause 107: The method of any of clauses 88-106, wherein the picture comprises a reference picture, the method further comprising: coding motion information for a current block of a current picture, the motion information including reference picture data identifying the reference picture and motion vector data identifying a reference block including at least a portion of the padding block; and forming a prediction block for the current block using the padding block.

Clause 108: The method of clause 107, wherein the reference block comprises a first reference block, the reference picture comprises a first reference picture, and the motion vector data includes data for a first current motion vector identifying the first reference block and a second current motion vector identifying a second reference block in a second reference picture for the current block, the method further comprising: determining a first weight to be applied to samples in the at least portion of the first reference block; and determining a second weight to be applied to samples of the first reference block that are within picture boundaries of the first reference picture.

Clause 109: The method of any of clauses 88-108, wherein at least one of the first motion vector or the second motion vector comprises a block vector identifying a reference block in the picture including the boundary block.

Clause 110: The method of any of clauses 88-109, further comprising encoding the boundary block prior to decoding the boundary block.

Clause 111: A device for decoding video data, the device comprising: a memory configured to store video data; and one or more processors implemented in circuitry and configured to: determine that a boundary block of a picture of the video data is bi-directional inter-predicted using a first motion vector and a second motion vector, the boundary block having an edge that touches an edge of the picture; decode the picture, including decoding the boundary block; form a first intermediate padding block using the first motion vector; form a second intermediate padding block using the second motion vector; form a padding block using the first intermediate padding block and the second intermediate padding block; and assign padding values of the padding block to a padding region of the picture neighboring the boundary block on an opposite side of the edge of the picture.

Clause 112: The device of clause 111, wherein the first intermediate padding block has a first size, the second intermediate padding block has a second size smaller than the first size, and the padding block has the first size, and wherein to form the padding block, the one or more processors are configured to: calculate padding values for a first region of the padding block corresponding to an overlap region between the first intermediate padding block and the second intermediate padding block from corresponding values of the first intermediate padding block and the second intermediate padding block; and determine padding values for a second region of the padding block from the first intermediate padding block, the second region of the padding block being outside of the overlap region.

Clause 113: The device of any of clauses 111 and 112, wherein to assign the padding values, the one or more processors are configured to: determine a first weight value and a second weight value; apply the first weight value to a first padding value at a position of the first intermediate padding block to form a first weighted padding value; apply the second weight value to a second padding value at a position of the second intermediate padding block co-located with the position of the first padding value of the first intermediate padding block to form a second weighted padding value; and calculate a final padding value at a position of the padding block co-located with the position of the first padding value and the position of the second padding value using the first weighted padding value and the second weighted padding value.

Clause 114: The device of any of clauses 111-113, further comprising a display configured to display the decoded video data.

Clause 115: The device of any of clauses 111-114, wherein the device comprises one or more of a camera, a computer, a mobile device, a broadcast receiver device, or a set-top box.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a boundary block of a picture of video data is bi-directional inter-predicted using a first motion vector and a second motion vector, the boundary block having an edge that touches an edge of the picture;
   decoding the picture, including decoding the boundary block;
   forming a first intermediate padding block using the first motion vector;
   forming a second intermediate padding block using the second motion vector;
   forming a padding block using the first intermediate padding block and the second intermediate padding block; and
   assigning padding values of the padding block to a padding region of the picture neighboring the boundary block on an opposite side of the edge of the picture.

2. The method of claim 1, wherein the first intermediate padding block and the second intermediate padding block have a common size.

3. The method of claim 1, wherein the first intermediate padding block has a first size, the second intermediate padding block has a second size smaller than the first size, and the padding block has the first size, and wherein forming the padding block comprises:
   calculating padding values for a first region of the padding block corresponding to an overlap region between the first intermediate padding block and the second intermediate padding block from corresponding values of the first intermediate padding block and the second intermediate padding block; and
   determining padding values for a second region of the padding block outside of the overlap region from the first intermediate padding block.

4. The method of claim 1, wherein the edge of the picture comprises one of a top edge of the picture, a left edge of the picture, a right edge of the picture, or a bottom edge of the picture.

5. The method of claim 4, wherein:
   when the edge of the picture comprises the top edge of the picture, the padding region is above the top edge of the picture,
   when the edge of the picture comprises the left edge of the picture, the padding region is to the left of the left edge of the picture,
   when the edge of the picture comprises the right edge of the picture, the padding region is to the right of the right edge of the picture, and
   when the edge of the picture comprises the bottom edge of the picture, the padding region is below the bottom edge of the picture.

6. The method of claim 4, wherein the edge of the picture comprises a first edge of the picture, and wherein the boundary block has a second edge that touches a second edge of the picture such that the boundary block is at a corner of the picture, wherein:
   when the first edge of the picture is the left edge of the picture and the second edge of the picture is the top edge of the picture, the padding region is above and to the left of the picture,
   when the first edge of the picture is the right edge of the picture and the second edge of the picture is the top edge of the picture, the padding region is above and to the right of the picture,
   when the first edge of the picture is the left edge of the picture and the second edge of the picture is the bottom edge of the picture, the padding region is below and to the left of the picture, and when the first edge of the picture is the right edge of the picture and the second edge of the picture is the bottom edge of the picture, the padding region is below and to the right of the picture.

7. The method of claim 1, further comprising:
determining a first size of the first intermediate padding block as being less than or equal to a distance between an edge of the first intermediate padding block and an edge of a first reference picture including the first intermediate padding block; and
determining a second size of the second intermediate padding block as being less than or equal to a distance between an edge of the second intermediate padding block and an edge of a second reference picture including the second intermediate padding block.

8. The method of claim 1, wherein assigning the padding values comprises:
determining a first weight value and a second weight value;
applying the first weight value to a first padding value at a position of the first intermediate padding block to form a first weighted padding value;
applying the second weight value to a second padding value at a position of the second intermediate padding block co-located with the position of the first padding value of the first intermediate padding block to form a second weighted padding value; and
calculating a final padding value at a position of the padding block co-located with the position of the first padding value and the position of the second padding value using the first weighted padding value and the second weighted padding value.

9. The method of claim 8, wherein the first weight value comprises 0.5 and the second weight value comprises 0.5.

10. The method of claim 8, wherein determining the first weight value comprises determining the first weight value according to bi-prediction with CU-level weight (BCW).

11. The method of claim 8, further comprising adding offset values to the first padding value and the second padding value prior to applying the first weight value and applying the second weight value.

12. The method of claim 11, further comprising calculating each of the offset values as being a difference between an average value of the boundary block and an average value of a reference block identified by either the first motion vector or the second motion vector.

13. The method of claim 8, further comprising adding offset values to the first weighted padding value and the second weighted padding value prior to calculating the final padding value.

14. The method of claim 8, further comprising applying an offset value to the final padding value.

15. The method of claim 1, further comprising applying decoder-side motion vector refinement (DMVR) to at least one of the first motion vector or the second motion vector when DMVR is enabled for the picture.

16. The method of claim 1, further comprising skipping decoder-side motion vector refinement (DMVR) for both the first motion vector and the second motion vector when DMVR is enabled for the picture.

17. The method of claim 1, further comprising applying bi-directional optical flow (BDOF) to at least one of the first motion vector or the second motion vector when BDOF is enabled for the picture.

18. The method of claim 1, further comprising skipping bi-directional optical flow (BDOF) for the first motion vector and the second motion vector when BDOF is enabled for the picture.

19. The method of claim 1, wherein when a reference block identified by one of the first motion vector or the second motion vector extends beyond an edge of a first reference picture or a second reference picture, forming the padding block comprises:
forming a first portion of the padding block using corresponding portions of the first intermediate padding block and the second intermediate padding block; and
forming a second portion of the padding block corresponding to the portion of the reference block that extends beyond the edge of the first reference picture or the second reference picture using only the first intermediate padding block or the second intermediate padding block.

20. The method of claim 1, wherein the picture comprises a reference picture, the method further comprising:
coding motion information for a current block of a current picture, the motion information including reference picture data identifying the reference picture and motion vector data identifying a reference block including at least a portion of the padding block; and
forming a prediction block for the current block using the padding block.

21. The method of claim 20, wherein the reference block comprises a first reference block, the reference picture comprises a first reference picture, and the motion vector data includes data for a first current motion vector identifying the first reference block and a second current motion vector identifying a second reference block in a second reference picture for the current block, the method further comprising:
determining a first weight to be applied to samples in the at least portion of the first reference block; and
determining a second weight to be applied to samples of the first reference block that are within picture boundaries of the first reference picture.

22. The method of claim 1, wherein at least one of the first motion vector or the second motion vector comprises a block vector identifying a reference block in the picture including the boundary block.

23. The method of claim 1, further comprising encoding the boundary block prior to decoding the boundary block.

24. A device for decoding video data, the device comprising:
a memory configured to store video data; and
one or more processors implemented in circuitry and configured to:
determine that a boundary block of a picture of the video data is bi-directional inter-predicted using a first motion vector and a second motion vector, the boundary block having an edge that touches an edge of the picture;
decode the picture, including decoding the boundary block;
form a first intermediate padding block using the first motion vector;
form a second intermediate padding block using the second motion vector;
form a padding block using the first intermediate padding block and the second intermediate padding block; and assign padding values of the padding block to a padding region of the picture neighboring the boundary block on an opposite side of the edge of the picture.

25. The device of claim 24, wherein the first intermediate padding block has a first size, the second intermediate padding block has a second size smaller than the first size, and the padding block has the first size, and wherein to form the padding block, the one or more processors are configured to:
calculate padding values for a first region of the padding block corresponding to an overlap region between the first intermediate padding block and the second intermediate padding block from corresponding values of the first intermediate padding block and the second intermediate padding block; and
determine padding values for a second region of the padding block from the first intermediate padding block, the second region of the padding block being outside of the overlap region.

26. The device of claim 24, wherein to assign the padding values, the one or more processors are configured to:
determine a first weight value and a second weight value;
apply the first weight value to a first padding value at a position of the first intermediate padding block to form a first weighted padding value;
apply the second weight value to a second padding value at a position of the second intermediate padding block co-located with the position of the first padding value of the first intermediate padding block to form a second weighted padding value; and
calculate a final padding value at a position of the padding block co-located with the position of the first padding value and the position of the second padding value using the first weighted padding value and the second weighted padding value.

27. The device of claim 24, further comprising a display configured to display the decoded video data.

28. The device of claim 24, wherein the device comprises one or more of a camera, a computer, a mobile device, a broadcast receiver device, or a set-top box.

29. A non-transitory computer-readable storage medium having stored thereon instructions that, when executed, cause a processor to:
determine that a boundary block of a picture of video data is bi-directional inter-predicted using a first motion vector and a second motion vector, the boundary block having an edge that touches an edge of the picture;
decode the picture, including decoding the boundary block;
form a first intermediate padding block using the first motion vector;
form a second intermediate padding block using the second motion vector;
form a padding block using the first intermediate padding block and the second intermediate padding block; and
assign padding values of the padding block to a padding region of the picture neighboring the boundary block on an opposite side of the edge of the picture.

30. A device for decoding video data, the device comprising:
means for determining that a boundary block of a picture of video data is bi-directional inter-predicted using a first motion vector and a second motion vector, the boundary block having an edge that touches an edge of the picture;
means for decoding the picture, including decoding the boundary block;
means for forming a first intermediate padding block using the first motion vector;
means for forming a second intermediate padding block using the second motion vector;
means for forming a padding block using the first intermediate padding block and the second intermediate padding block; and
means for assigning padding values of the padding block to a padding region of the picture neighboring the boundary block on an opposite side of the edge of the picture.

* * * * *